United States Patent
Sargent et al.

(10) Patent No.: US 7,518,796 B2
(45) Date of Patent: *Apr. 14, 2009

(54) OPTICAL DEVICE HAVING NONMONOTONIC TRANSFER FUNCTION AND APPLICATIONS USING SAME

(75) Inventors: Edward H. Sargent, Toronto (CA); Lukasz Brzozowski, Toronto (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1409 days.

This patent is subject to a terminal disclaimer.

(21) Appl. No.: 10/068,472

(22) Filed: Feb. 8, 2002

(65) Prior Publication Data
US 2002/0195208 A1 Dec. 26, 2002

Related U.S. Application Data

(60) Provisional application No. 60/267,879, filed on Feb. 9, 2001, provisional application No. 60/325,570, filed on Sep. 28, 2001.

(51) Int. Cl.
*G02B 1/10* (2006.01)
(52) U.S. Cl. .................................. 359/580; 359/108
(58) Field of Classification Search ................. 359/107, 359/108, 240, 244; 708/191; 372/21
See application file for complete search history.

(56) References Cited

U.S. PATENT DOCUMENTS

| | | | |
|---|---|---|---|
| 4,128,300 A | 12/1978 | Stotts et al. | 350/96.14 |
| 4,262,992 A | 4/1981 | Berthold, III | 350/96.14 |
| 4,507,776 A * | 3/1985 | Smith | 398/101 |
| 4,573,767 A | 3/1986 | Jewell | 350/354 |
| 4,764,889 A | 8/1988 | Hinton et al. | 364/807 |
| 4,864,536 A | 9/1989 | Lindmayer | 365/119 |
| 4,894,818 A | 1/1990 | Fujioka et al. | 370/3 |
| 4,930,873 A | 6/1990 | Hunter | 350/354 |
| 4,932,739 A | 6/1990 | Islam | 350/96.15 |
| 4,962,987 A | 10/1990 | Doran | 350/96.15 |
| 4,965,760 A | 10/1990 | Cykendall et al. | 364/713 |
| 4,992,654 A | 2/1991 | Crossland et al. | 250/213 |
| 5,078,464 A | 1/1992 | Islam | 385/122 |
| 5,144,375 A | 9/1992 | Gabriel et al. | 356/345 |
| 5,315,422 A | 5/1994 | Utaka et al. | 359/107 |
| 5,349,593 A | 9/1994 | Lomashevitch et al. | 372/50 |
| 5,461,507 A | 10/1995 | Westland et al. | 359/289 |
| 5,479,384 A | 12/1995 | Toth et al. | 364/14 |
| 5,488,501 A | 1/1996 | Barnsley | 359/137 |

(Continued)

OTHER PUBLICATIONS

L. Brzozowski and Edward H. Sargent, "All-optical analog-to-digital converters, hardlimiters, and logic gates", J. of Lightwave Technology, 19(1), pp. 114-119(Jan. 2001).*

(Continued)

*Primary Examiner*—Arnel C Lavarias
(74) *Attorney, Agent, or Firm*—Anderson Gorecki & Manaras LLP

(57) ABSTRACT

An entirely passive all-optical device, referred to as an optical hard limiter, includes alternating layers of materials having oppositely signed Kerr coefficients and substantially different linear indices of refraction, wherein the higher linear index material has the negative Kerr coefficient and the lower index material has the positive Kerr coefficient. The optical device has two distinct transmittance curves. Various optical devices and systems can be built from such optical hard limiters.

3 Claims, 41 Drawing Sheets

U.S. PATENT DOCUMENTS

| | | | | |
|---|---|---|---|---|
| 5,537,243 | A | 7/1996 | Fatehi et al. | 359/541 |
| 5,617,232 | A | 4/1997 | Takemori | 359/108 |
| 5,623,366 | A | 4/1997 | Hait | 359/577 |
| 5,655,039 | A | 8/1997 | Evans | 385/27 |
| 5,737,102 | A | 4/1998 | Asher | 359/107 |
| 5,739,933 | A | 4/1998 | Dembeck et al. | 359/117 |
| 5,740,287 | A | 4/1998 | Scalora et al. | 385/6 |
| 5,831,731 | A | 11/1998 | Hall et al. | 356/345 |
| 5,999,283 | A | 12/1999 | Roberts et al. | 359/108 |
| 5,999,284 | A | 12/1999 | Roberts | 359/108 |
| 6,005,791 | A | 12/1999 | Gudesen et al. | 365/114 |
| 6,041,126 | A | 3/2000 | Terai et al. | 381/71.6 |
| 6,044,341 | A | 3/2000 | Takahashi | 704/226 |
| 6,636,337 | B2 * | 10/2003 | Johnson et al. | 359/108 |

OTHER PUBLICATIONS

J. A. Salehi, C. A. Brackett, 'Code division multiple-access techniques in optical fiber networks- Part II: Systems performance analysis', IEEE Trans. Commun., vol. 37, No. 8, Aug. 1989, pp. 834-842.*

L. K. Kahn, 'Optical power limiting in multilayer systems with nonlinear response', Phys. Rev. B, vol. 53, No. 3, Jan. 15, 1996, pp. 1429-1437.*

L. Brzozowski, E. H. Sargent, 'Photonic crystals for integrated optical computing', Proc. SPIE, vol. 4089, Jun. 18, 2000, pp. 786-796.*

"Wave proagation in nonlinear photonic band-gap materials," Li et al., Physical Review B: Condensed Matter, vol. 53, No. 23, 15577-15585 (Jun. 15, 1996).

"The Interaction of Electromagnetic Radiation with Magnetic Media," http://www.qub.ac.uk/mp/con/magnetics_group/magnetoptics.html.

"Three-Dimensional Arrays in Polymer Nanocomposites," Kumacheva et al., Advanced Materials, 1999, 11, No. 3.

"Intergrable, Low-Cost, All-Optical WDM Signal Processing: Narrowband Hard Limiters and Analog-to-Digital Converters," Sargent et al., Jan. 2000.

"Nonlinear Distributed Feedback Structures for Optical Sensor Protection," Brzozowski et al., Apr. 2000.

"Optical Signal Processing Using Nonlinear Distributed Feedback Structures," Brzozowski et al., IEEE Journal of Quantum Electronics, vol. 36, No. 5, May 2000.

"All-Optical Analog-to-Digital Converter for Photonic Networks Using Multilevel Signalling," Brzozowski et al., Jun. 2000.

"Photonic Crystals for Intergrated Optical Computing," Brzozowski et al., Jun. 2000.

"Nonlinear distributed-feedback structures as passive optical limiters," Brzozowski et al., J. Opt. Soc. Am B, vol. 17, No. 8, Aug. 2000.

"Stability of Periodic Nonlinear Optical Structures for Limiting and Logic," Brzozowski et al., Sep. 2000.

"Transmission Regimes of Period Nonlinear Optical Structures," Pelinovsky, Dmitry, Rapid Communications Physical Review E., vol. 62, No. 4, Oct. 2000.

"Nonlinear Disordered Media for Broad-Band Optical Limiting," Brzozowski et al., IEEE Journal of Quantum Electronics, vol. 36, No. 11, Nov. 2000.

"Realization of All-Optical Ultrafast Logic Gates Using Triple Core Asymmetric Nonlinear Directional Coupler," Natasa Trivunac-Vukovic, Journal of Optical Communications, 2001.

"All-Optical Analog-to Digital Converters, Hardlimiters, and Logic Gates," Brzozowski et al., Journal of Lightwave Technology, vol. 19, No. 1, Jan. 2001.

"Stable All-Optical Limiting in Nonlinear Periodic Structures," Pelinovsky et al., Feb. 8, 2001.

"All-Optical Signal Processing and Packet Forwarding Using Nonmonotonic Intensity Transfer Characteristics,"Johnson, E.V., A thesis submitted in conformity with the requirements for the degree of Master of Applied Science Graduate Department of electrical and Computer Engineering University of Toronto, 2001.

"Bistable Optical Devices Promise Subpicosecond Switching," Smith et al., IEEE Spectrum, Jun. 1981.

"Self-Pulsing and Chaos in Distributed Feedback Bistable Optical Devices," Winful et al., American Institute of Physics, Feb. 15, 1982.

"The Nonlinear Coherent Coupler," Jensen, Stephen M., IEEE Journal of Quantum Electronics, vol. QE-18, No. 10, Oct. 1982.

"All Optical Multiple-Quantum-Well Waveguide Switch,"Li Kam Wa et al., Nov. 12, 1984.

"Nonlinear Light Transfer in Tunnel-Coupled Optical Waveguides,"Gusovskii et al., Sov. J. Quantum Electron, vol. 15, No. 11, Nov. 1985.

"Performance of an 8 X 8 $LiNbO_3$ Switch Matrix as a Gigahertz Self-Routing Switching Node," Blumenthal et al., Oct. 1, 1987.

"Ultrafast All-Optical Switching in a Dual-Core Fiber Nonlinear Coupler," Friberg et al., Appl. Phys. Lett. 51 (15), Oct. 12, 1987.

"Self-Clocked Optical Control of a Self-Routed Photonic Switch," Perrier et al., Journal of Lightwave Technology, vol. 7, No. 6, Jun. 1989.

"Optical Bistability in Semiconductor Periodic Structures," He, J., et al., IEEE Journal of Quantum Electronics, vol. 27, No. 5, May 1991.

"Demonstration of Photonic Fast Packet Switching at 700 Mbit/s Data Rate," Ha et al., Electronics Letters, vol. 27, No. 10, May 9, 1991.

"Analysis of Optical Bistability in a Nonlinear Distributively Coupled Resonator," Dubovitsky et al., IEEE Journal of quantum Electronics, vol. 28, No. 3, Mar. 1992.

"Ultrafast All-Optical Switching in Semiconductor Nonlinear Directional Couplers at Half the Band Gap, "Villeneuve et al., Appl. Phys. Lett., vol. 61, No. 2, Jul. 13, 1992.

"Smart Pixels Using the Light Amplifying Optical Switch (LAOS)," Wilmsen et al., IEEE Journal of Quantum Electronics, vol. 29, No. 2, Feb. 1993.

"A Terahertz Optical asymmetric Demultiplexer (TOAD)," Sokoloff et al., IEEE Photonics Technology Letters, vol. 5, No. 7, Jul. 1993.

"Compact 40 Gbit/s Optical Demultiplexer Using a GaInAsP Optical Amplifier," Ellis et al., Electronics Letters, vol. 29, No. 24, Nov. 25, 1993.

"All Optical Wavelength Conversion by SOA's in a March-Zehnder Configuration," Durhuus et al., IEEE Photonics Technology Letters, vol. 6, No. 1, Jan. 1994.

"First Demonstration of Multihop All-Optical Packet Switching," Blumenthal et al., IEEE Photonics Technology Letters, vol. 6, No. 3, Mar. 1994.

"Improved All-Optical Switching in a Three-Slab Nonlinear Directional Coupler with Gain," Di Pasquale et al., IEEE Journal of Quantum Electronics, vol. 30, No. 5, May 1994.

"40 Gbit/s All-Optical Demultiplexing Using a Monolithically Integrated Mach-Zehnder Interferometer With Semiconductor Laser Amplifiers," Jahn et al, Electronics Letters, vol. 31, No. 21, Oct. 12, 1995.

"Optical Bistability in Reflective Fiber Gratings," Shi Choa-Xiang, IEEE Journal of Quantum Electronics, vol. 31, No. 11, Nov. 1995.

"Monolithically Integrated Aymmetric Mach-Zehnder Inteferometer as a 20 Bbit/s All-Optical Add/Drop Multiplexer for OTDM Systems," Jahn et al., Electronics Letters, vol. 32, No. 3, Feb. 1, 1996.

"10 Gb/s Operation of a Multiwavelength Buffer Architecture Employing a Monolithically Integrated All-Optical Interferometric Michelson Wavelength Converter," Danielsen et al., IEEE Photonics Technology Letters, vol. 8, No. 3, Mar. 1996.

"Monolithically Integrated Nonlinear Sagnac Interferometer and its Application as a 20 Gbit/s All-Optical Demultiplexer," Jahn et al., Electronics Letters, vol. 32, No. 9, Apr. 25, 1996.

"Design and Implementation of a Fully Reconfigurable All-Optical Crossconnect for High Capacity Multiwavelength Transport Networks," Jourdan et al., Journal of Lightwave Technology, vol. 14, No. 6, Jun. 1996.

"Experimental Demonstration of an All-Optical Routing Node for Multihop Wavelength Routed Networks," Shell et al., IEEE Photonics Technology Letters, vol. 8, No. 10, Oct. 1996.

"Supermode Analysis of the Three-Waveguide Nonlinear Directional Coupler: The Critical Power," Artigas et al., Optics communications. vol. 131, Oct. 15, 1996.

"Unbalanced TOAD for Optical Data and Clock Separation in Self-Clocked Transparent OTDM Networks,"Deng et al., IEEE Photonics Technology Letters, vol. 9, No. 6, Jun. 1997.

"Analysis of Power-Dependent Switching Between Radiatively Coupled Planar Waveguides," Shamonin et al., Journal of Lightwave Technology, vol. 15, No. 6, Jun. 1997.

"All-Optical Updating of Subcarrier Encoded Packet Headers with Simultaneous Wavelength Conversion of Baseband Payload in Semiconductor Optical Amplifiers," Vaughn et al., IEEE Photonics Technology Letters, vol. 9, No. 6, Jun. 1997.

"Optical Rate Conversion for High-Speed TDM Networks," Patel et al., IEEE Photonics Technology Letters, vol. 9, No. 9, Sep. 1997.

"Temporal Solitary Subpicosecond Pulse Propagation in a Dye-Doped Polymer Slab Waveguide With a Negative Nonlinear Refractive Index," Yamakawa et al., Applied Physics Letters, vol. 72, No. 13, Mar. 30, 1998.

"Interferometric All-Optical Switches for Ultrafast Signal Processing," Patel et al., Applied Optics, vol. 37, No. 14, May 10, 1998.

"100-Gbjt/s Bitwise Logic," Hall et al., Optics Letters, vol. 23, No. 16, Aug. 15, 1998.

"Application of the Polyconjugated Main Chain Polymer DPOP-PPV for Ultrafast All-Optical Switching in a Nonlinear Directional Coupler," Gabler, et al., Chemical Physics, vol. 245, 1999.

"All-Optical Routing Using Wavelength Recognizing Switches," Hoanca et al., Journal of Lightwave Technology, vol. 16, No. 12, Dec. 1998.

"80 Gbit/s All-Optical Regenerative Wavelength Conversion Using Semiconductor Optical Amplifier Based Interferometer," Kelly et al., Electronics Letters, vol. 35, No. 17, Aug. 19, 1999.

"All-Fiber Logical Devices Based on the Nonlinear Directional Coupler," Wang et al., IEEE Photonics Technology Letters, vol. 11, No. 1, Jan. 1999.

"Nonlinear Optics for High-Speed Digital Information Processing," Cotter et al., Science, vol. 286, Nov. 19, 1999.

"Design Issues of Optical IP Routers for Internet Backbone Applications," Callegati et al., IEEE Communications Magazine, Dec. 1999.

"All-Optical Clock and Data Separation Technique for Asynchronous Packet-Switched Optical Time-Division-Multiplexed Networks, " Toliver et al., Optics Communications, vol. 173, Jan. 1, 2000.

"Optical Signal Processing Using Nonlinear Distributed Feedback Structures," Brzozowski et al., IEEE Journal of Quantum Electronics, vol. 36, No. 5, May 2000.

"nonlinear Distributed-Feedback Structures as Passive Optical Limiters," Brzozowski et al., J. Opt. Soc. Am. B, vol. 17, No. 8, Aug. 2000.

"Transmission Regimes of Periodic Nonlinear Optical Structures," Pelinovsky et al., Rapid Communications Physical Review E, vol. 62, No. 4, Oct. 2000.

'Experimental Demonstration of an All-Optical 2R Regenerator with Adjustable Decision Threshold and "True" Regeneration Characteristics,' Morthier et al., IEEE Photonics Technology Letters, vol. 12, No. 11, Nov. 2000.

"All-Optical Time-Domain IP Router Using Optical Limiters," Johnson et al., IEEE, 2000.

"Optical Properties of Selected Third Order NLO Materials," Chapter 8, pp. 445-496.

"Opto-Mechanical, Electro-Optic, Acoustic-Optic, and Magneto-Optic Switches", Photonic Switching and Computing, pp. 836-855.

Brzozowski et al All-Optical Analog-to-Digital Converters, Hardlimiters, And Logic Gates, Journal of Lightwave Technology, vol. 19, No. 1, pp. 114-119, Jan. 20, 2001.

* cited by examiner

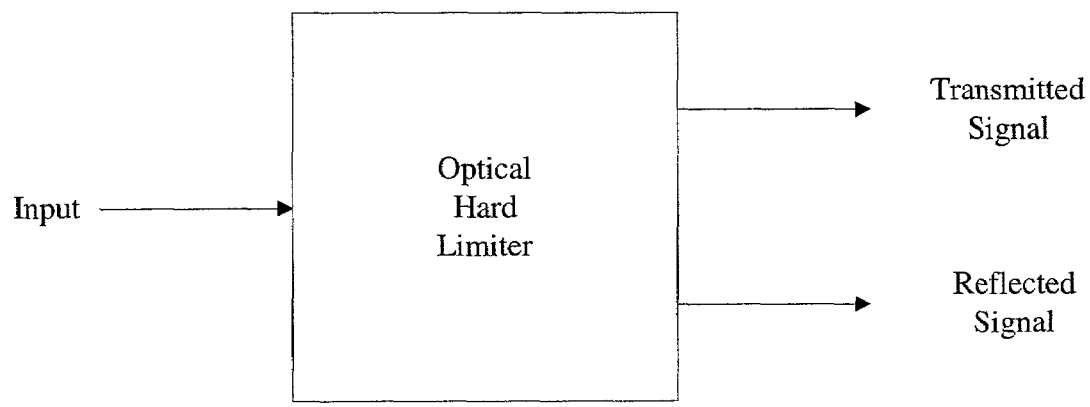
FIG. 1    100
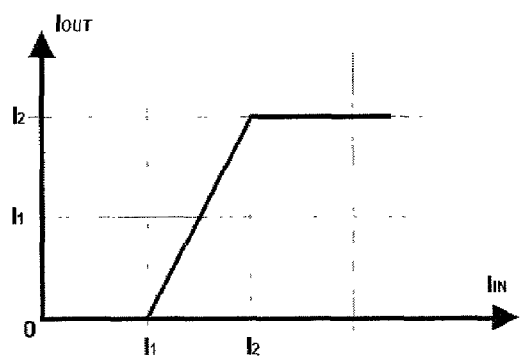
FIG. 2A    200

FIG. 6    600
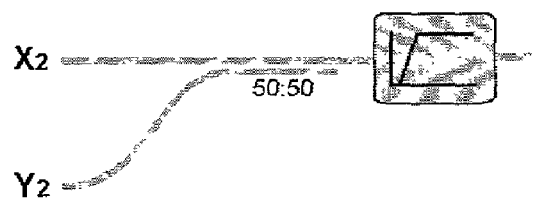
FIG. 7    700
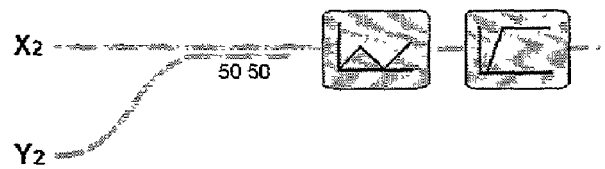
FIG. 8    800
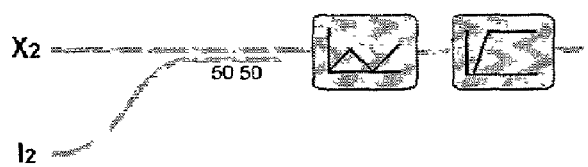
FIG. 9    900

|  | 0 < INPUT < I1 | I1 < INPUT < I2 | I2 < INPUT |
|---|---|---|---|
| ITRANSMITTED | 0 | 2*INPUT - I2 | I2 |
| IREFLECTED | INPUT | I2 - INPUT | INPUT - I2 |

FIG. 14  1400

| data bits | | | | | | | address bits | | | | | flag |
|---|---|---|---|---|---|---|---|---|---|---|---|---|
| D | D | D | D | D | D | D | N | N-1 | ••• | 2 | 1 | F |

FIG. 26  8100

| | | | | | | | N | N-1 | ••• | | 2 | 1 | F | |
|---|---|---|---|---|---|---|---|---|---|---|---|---|---|---|
| | | | | | | N | N-1 | | ••• | | 2 | 1 | F | |
| | | | | | | | • | | | | | | | |
| | | | | | | | • | | | | | | | |
| | | | | | | | • | | | | | | | |
| | | N | N-1 | | ••• | | 2 | 1 | F | | | | | |
| | N | N-1 | | ••• | | 2 | 1 | F | | | | | | |
| N | N-1 | | ••• | | 2 | 1 | F | | | | | | | |

OPTICAL DEVICE HAVING NONMONOTONIC TRANSFER FUNCTION AND APPLICATIONS USING SAME

PRIORITY

The present application claims priority from the following United States Provisional Patent Applications, which are hereby incorporated herein by reference in their entireties:

U.S. Provisional Patent Application No. 60/267,879, which was filed on Feb. 9, 2001; and U.S. Provisional Patent Application No. 60/325,570, which was filed on Sep. 28, 2001.

FIELD OF THE INVENTION

The present invention relates generally to nonlinear optical devices, and more particularly to an optical device having a nonmonotonic transfer function.

BACKGROUND OF THE INVENTION

The term 'optical switch', as used herein, refers generally to a device that reflects incident light, when the light is at a low level of intensity, transmits only a portion of the incident light at intermediate intensities, and saturates transmitted intensity for high incident intensities. The threshold for the partially transmitting behavior is half of that for saturation and is explicitly defined in terms of material parameters.

Currently, most of complex signal-processing operations such as switching, logic functions, or routing are done in the electrical domain. This necessitates costly electro-optical and opto-electrical conversions. Suitably deployed, all-optical devices could reduce or eliminate the need for repeated EO and OE conversion, simplifying optical networks.

A variety of non-electronic switches have been proposed. As discussed in detail in Salech & Teich, *Fundamentals of Photonics*, pp. 843-855 (1991), hereinafter Salech & Teich, most non-electronic switches are opto-mechanical, electro-optic, acousto-optics or magneto optics switches. All of these approaches require external switching, hence are not passive. In addition the time of response of such switches is limited by the driving mechanical, electrical, acoustic or magnetic control.

Fully optical devices usually rely on the principle of bistabiltiy as discussed in detail in Salech & Teich, pp. 843-855. A drawback of bistable devices is that, for some incident intensities, there may be two or more possible transmitted intensities. The instantaneous state of transmission or reflection may thus depend upon the history of the state of transmission and such devices may additionally exhibit chaotic behavior.

SUMMARY OF THE INVENTION

An entirely passive all-optical device consists of alternating layers of materials having oppositely signed Kerr coefficients and substantially different linear indices of refraction, wherein the higher linear index material has the negative Kerr coefficient and the lower linear index material has the positive Kerr coefficient. The optical device has two distinct transmittance curves, an S-curve substantially as shown in FIG. 40 and an N-curve substantially as shown in FIG. 41. The optical device is stable, and so does exhibit certain drawbacks of bistable devices (such as two or more possible transmitted intensities for some incident intensities, such that the instantaneous state of transmission or reflection may depend upon the history of the state of transmission resulting in chaotic behavior).

Various optical logic devices are formed using stable, non-absorbing optical hard limiters. These optical logic devices are able to process information optically without the need to convert the information to an electronic form for processing electronically. An optical gain element is formed using three stable, non-absorbing optical hard limiters. An optical AND gate is formed using the transmitted signal of a single stable, non-absorbing optical hard limiter. An optical OR gate is formed using an optical gain element. An optical XOR gate is formed by coupling the reflected output of a stable, non-absorbing optical hard limiter as the input to an optical gain element. An optical NOT gate is formed by coupling the reflected output of a stable, non-absorbing optical hard limiter as the input to an optical gain element. An optical NAND gate is formed by coupling the output of an optical AND gate as the input to an optical NOT gate. An optical NOR gate is formed by coupling the output of an optical OR gate as the input to an optical NOT gate.

An optical sampler based on stable, non-absorbing optical hard limiters includes an optical feedback loop for storing an optical signal in optical form. The optical feedback loop includes appropriate components for amplifying/reproducing the stored optical signal. The optical sampler outputs the stored optical signal.

An optical noise subtractor includes a first optical coupler operably coupled to receive a reference signal B and a control signal of intensity I2 and to output a first combined signal therefrom, a first optical hard limiter operably coupled to receive the first combined signal from the first optical coupler and to output a reflected signal therefrom, a second optical coupler operably coupled to receive an information signal A and a bias signal of intensity I2 and to output a second combined signal therefrom, a third optical coupler operably coupled to receive the reflected signal from the first optical hard limiter and the second combined signal from the second optical coupler and to output a third combined signal therefrom, and a second optical hard limiter operably coupled to receive the third combined signal from the third optical coupler and to output a transmitted signal therefrom. The first combined signal output from the first optical coupler is substantially equal to (B/2+I1). The reflected signal output by the first optical hard limiter is substantially equal to (I1−B/2). The second combined signal output by the second optical coupler is substantially equal to (A/2+I1). The third combined signal output by the third optical coupler is substantially equal to 0.5(I1−B/2+A/2+I1). The transmitted signal output by the second optical hard limiter is substantially equal to 0.5(A−B). I2 is substantially equal to two times I1.

A method for subtracting analog noise from an optical communication channel using stable, non-absorbing optical hard limiters may involve combining a reference signal B with a control signal of intensity I2 through a 3 dB optical coupler to form a first combined signal having an intensity substantially equal to (B/2+I1), processing the first combined signal by an optical hard limiter to form a reflected signal having an intensity substantially equal to (I1−B/2), combining an information signal A with a bias signal of intensity I2 through a 3 dB optical coupler to form a second combined signal, combining the reflected signal and the second combined signal through a 3 dB optical coupler to form a third combined signal having an intensity substantially equal to 0.5(I1−B/2+A/2+I1), and processing the third combined signal by an optical hard limiter to form a transmitted signal having an intensity substantially equal to 0.5(A−B). I2 is substantially equal to two times I1.

A method for subtracting analog noise from an optical communication channel using stable, non-absorbing optical hard limiters may involve compressing a reference signal B in the range $\{0, I2\}$ into a compressed reference signal in the range $\{I1, I2\}$, inverting the compressed reference signal to form an inverted compressed reference signal, compressing an information signal A in the range $\{0, I2\}$ into a compressed information signal in the range $\{I1, I2\}$, combining the inverted compressed reference signal and the compressed information signal to form a combined signal essentially subtracting the compressed reference signal from the compressed information signal, and expanding the combined signal in the range $\{I1, I2\}$ into a transmitted signal in the range $\{0, I2\}$, wherein I2 is substantially equal to two times I1.

Optical automatic gain control (AGC) is accomplished using stable, non-absorbing optical hard limiters and various optical logic gates derived therefrom. The AGC mechanism preserves the ratios between signal levels and provides an adjustable amount of gain. An optical automatic gain controller typically includes a number of AGC stages, where, in each AGC stage, a threshold input signal derived from an optical input signal is compared against a predetermined threshold for the AGC stage, and a gain input signal also derived from the optical input signal is amplified if and only if the threshold input signal is below the predetermined threshold. The threshold is reduced in each successive AGC stage.

An optical switching device based on stable, non-absorbing optical hard limiters optically switches optical information from an input to a number of outputs based upon address information contained in the optical information. The optical switching device optically detects the location of the address bits in the optical information, optically samples the address bits, optically decodes the sampled address bits, optically activates an output based upon the decoded address bits, and optically outputs the optical information over the activated output.

In one exemplary optical switching device, the optical information is split into successive copies with approximately one bit time delay between successive copies. Each of a number of successive copies is fed into an optical sampler, and the optical samplers are clocked at an appropriate time to sample a different address bit.

In another exemplary optical switching device, the optical information is sampled using an optical shift register.

An optical analog-to-digital converter (ADC) based on stable, non-absorbing optical hard limiters includes a plurality of processing levels numbered one to N, wherein a processing level x (with x=1 to N) includes (x−1) optical limiters biased such that $a=I=2^{x-1}$ and operably coupled in series such that the transmitted signal from one optical limiter is coupled as the input to the subsequent optical limiter, the transmitted signal of the final optical limiter in the series represents the optical output signal for the processing level x, and the reflected signals from the (x−1) optical limiters are coupled together as the input to the processing level (x−1).

BRIEF DESCRIPTION OF THE DRAWINGS

The accompanying description of various embodiments of the invention should be appreciated more fully with reference to the accompanying drawings wherein:

FIG. 1 is a schematic block diagram showing the input, transmitted output, and reflected output of an exemplary optical hard limiter in accordance with an embodiment of the present invention;

FIG. 2A is a graph showing the idealized transmitted transfer function of an optical hard limiter in accordance with an embodiment of the present invention;

FIG. 6 is a schematic block diagram showing an optical AND gate in accordance with an embodiment of the present invention;

FIG. 7 is a schematic block diagram showing an optical OR gate in accordance with an embodiment of the present invention;

FIG. 8 is a schematic block diagram showing an optical XOR gate in accordance with an embodiment of the present invention;

FIG. 9 is a schematic block diagram showing an optical NOT gate in accordance with an embodiment of the present invention;

FIG. 14 is block diagram showing the relationship between the input signal, transmitted signal, and reflected signal of an exemplary optical hard limiter in accordance with an embodiment of the present invention;

FIG. 26 is a block diagram showing the format of an exemplary packet in accordance with an embodiment of the present invention;

FIG. 30 is a block diagram showing the relative timing of successive packet copies produced by the copying/delaying logic in accordance with an embodiment of the present invention;

DETAILED DESCRIPTION OF A PREFERRED EMBODIMENT

In accordance with embodiments of the present invention, structures are provided that advantageously provide for rapid optical signal processing while substantially preserving the coherence of an incident light beam, and reflecting some or all of the incident radiation that is not transmitted through the device. The optical switches of the present invention rely upon nonlinear reflection of light and do not require mechanical, electrical, acoustic or mechanical assistance.

Figure 38:
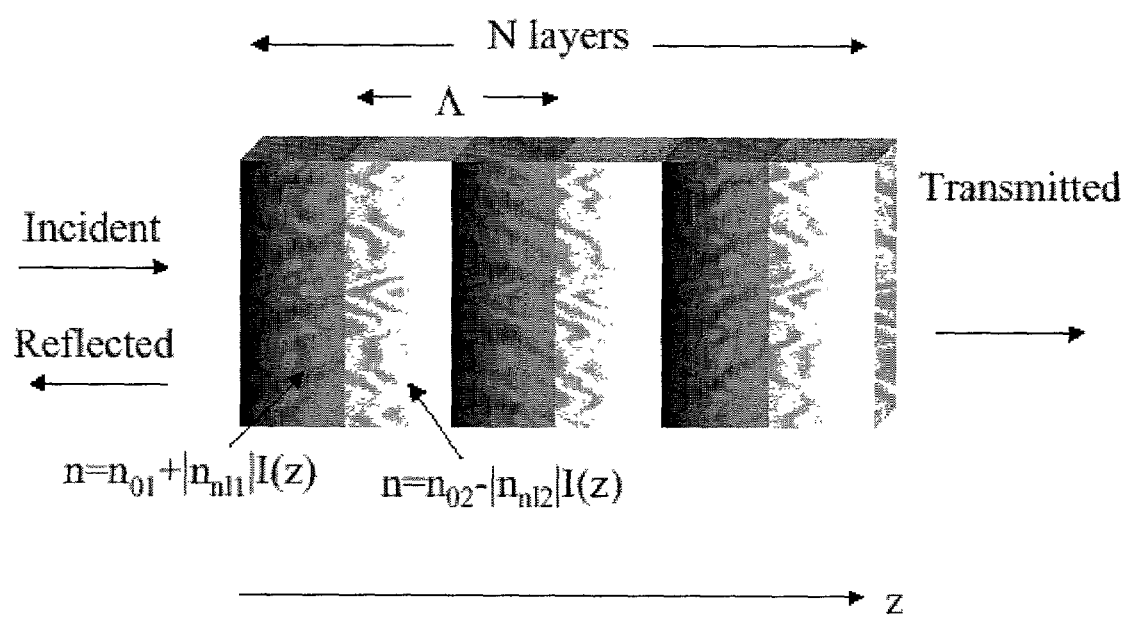
FIG. 38 shows a schematic cross sectional view of an optical limiter structure having alternating layers of materials with different linear refractive index and Kerr coefficients of opposite sign, in accordance with preferred embodiments of the invention.

FIG. 38 shows a structure consisting of alternating layers of two different materials, each one possessing Kerr nonlinearity. The index of refraction of a material possessing a Kerr nonlinearity can be expressed as $n=n_0+n_{nl} I$, where $n_0$ is the linear part of the index of refraction, $n_{nl}$ is the coefficient of the nonlinear, intensity-dependent part, also referred to herein as the Kerr coefficient" of the material, and I is the local intensity of light in the medium. As discussed in detail, for example, in Saleh & Teich, pp. 751-52, the nonlinear Kerr coefficient $n_{nl}$ can have either a positive or negative sign, the total index of refraction increasing or decreasing, respectively, with increasing optical intensity. It is to be understood that the index components may be wavelength-dependent to some extent, but that dispersion is ignored for convenience of the present description.

Structure shown in FIG. 38 consists of alternating layers of a first substantially transparent medium having a first Kerr coefficient $n_{nl1}$ and a second substantially transparent medium having a second Kerr coefficient $n_{nl2}$. The Kerr coefficients of the first and second media are of opposite sign and of substantially equal absolute value $|n_{nl1}|=|n_{nl2}|$. The linear parts of the respective indices of refraction are different. The materials are arranged 'out of phase'. The out of phase arrangement requires for the material with higher linear index to have negative nonlinear coefficient and for the material with lower refractive index to have positive nonlinear coefficient.

In accordance with preferred embodiments of the invention, the optical thicknesses of the respective layers are chosen to achieve a quarter-wave condition (or, Bragg resonance condition), which is to say that, at a wavelength $\lambda_0$ characterizing the incident optical radiation, the thickness d of each layer is such that $4 d n_0=\lambda_0$, where $n_0$ is the low-intensity limit of the index of refraction of each of the media, or, equivalently, that the thickness $\Lambda$ of each period is such that $\omega_0(n_{01}+n_{02})/c=2\pi/\Lambda$, where $\omega_0$ is the angular frequency of the incident light.

Methods have been shown for analyzing light propagation through structures such as structure in FIG. 38, subject to various assumptions. For example, subject to rigorous periodicity of the structure, an analysis is provided in Brzozowski and Sargent, "All-Optical Analog-to-Digital Converter, Hardlimiters, and Logic Gates," *Journal of Lightwave Technology*, vol. 19, pp.114-119 (2001) (hereinafter "Brzozowski & Sargent"), which is hereby incorporated herein by reference in its entirety. An out of phase arrangement is assumed. It is to be noted that structures of alternate designs, wherein the layer thicknesses vary and are not rigorously periodic, or where other of the assumptions are lifted, are within the scope of the present invention as described herein and as claimed in the appended claims, and may be applied in order to tailor specified bandpass profiles or for other reasons.

By employing a slowly-varying envelope approximation, coupled mode equations may be solved simultaneously for the forward- and backward-propagating waves, as described in Brzozowski & Sargent, to track intensity within the structure as a function of displacement z relative to the plane of incidence.

The optical behavior of the structure shown in FIG. 38 is now discussed with reference to FIGS. 39, 40, and 41.

Figure 39:
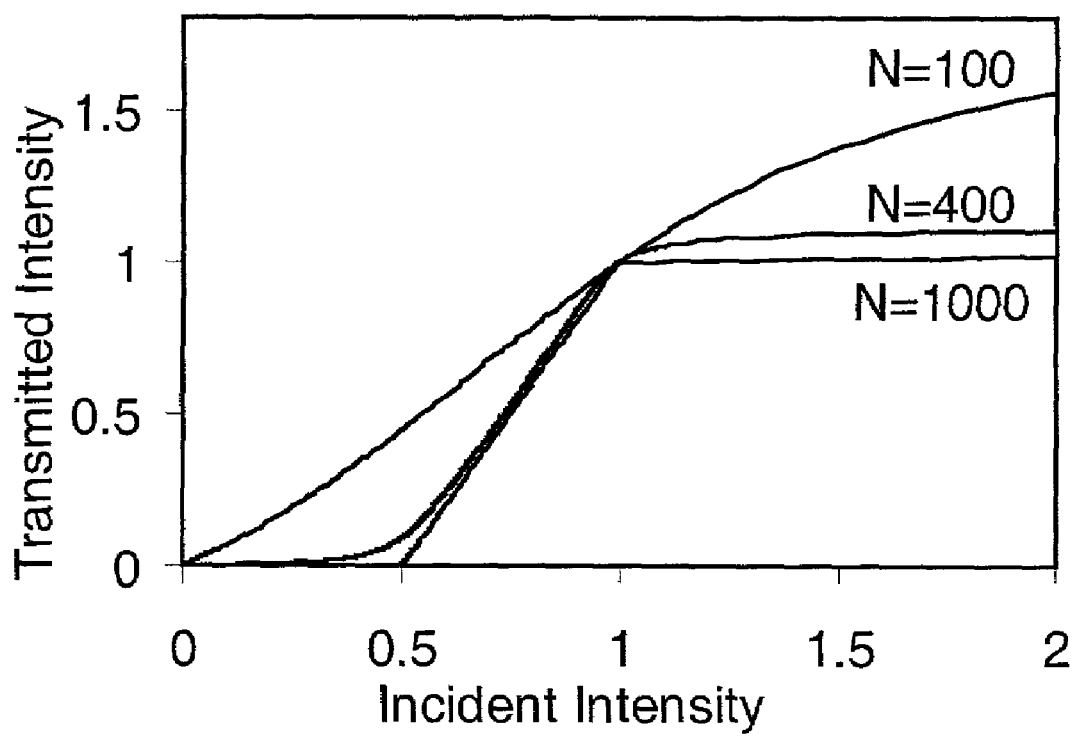
FIG. 39 is a plot of transmitted intensity as a function of incident intensity, both in normalized units, as calculated for a structure shown in FIG. 1 for various numbers of layers.

The incident intensity, increasing from 0 to 100, in normalized units reciprocal to those of $n_{nl}$, is plotted along the abscissa of FIG. 39. The thicknesses of the layers are chosen to achieve the quarter-wave condition in the low-intensity limit. For purposes of illustration, the indices of refraction of the alternating two materials were taken to be, respectively, $n_1=1.5+(0.01)$ I and $n_2=1.52-(0.01)$ I. Note that the Kerr coefficient has units reciprocal to those of the light intensity, and normalized intensity units are employed in the following discussion.

The labeling of curves in FIG. 39 refers to the number N of alternating layers in the structure of FIG. 38. In each case, for very low incident intensities, on the left side of the curves, the transmitted intensity, plotted along the ordinate, is substantially lower than incident intensity. As the incident intensity is increased the transmitted intensity begins to roll off, eventually equating itself with the incident intensity. For even higher incident intensities the transmitted intensity rolls off again, saturating at the limiting value. For convenience, the transfer curves shown in the FIG. 39 are referred to as the S-curves. As illustrated, the features of the S-curve get sharper with increasing numbers of layers.

For low intensity radiation the quarter-wave built-in grating effectively reflects incident light. As the incident intensity is increased, the indices of refraction of the alternating layers of material change in opposite senses, closing the initial grating, increasing the transmittance. For even higher intensities the grating reopens again, again decreasing the transmnittance.

The use of materials with opposite Kerr characteristics advantageously keeps the center of the optical band of operation at a desired frequency. Additionally, the alternating sense of the Kerr coefficient ensures that the transmitted intensity is a monotonic function of the incident intensity thus precluding the occurrence of mulitstability as is known to occur in certain other multilayer structures.

Figure 40:
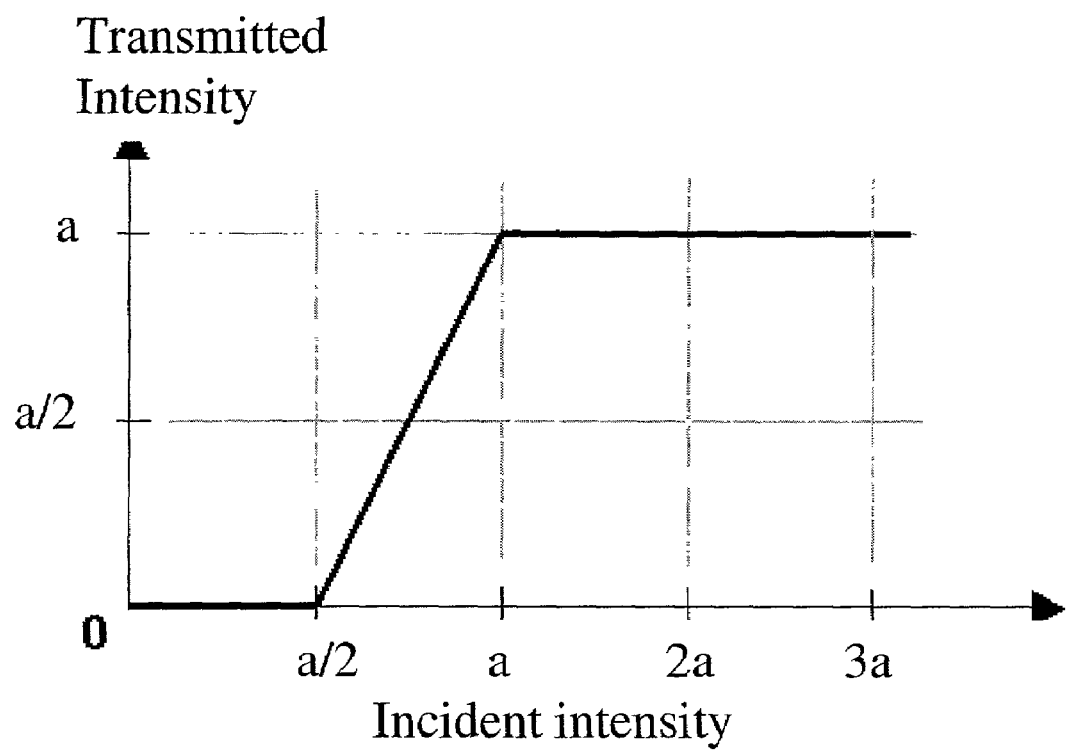
FIG. 40 is a plot of transmitted intensity as a function of incident intensity, both in normalized units, as calculated for a structure shown in FIG. 38 for long-device.
Figure 41:
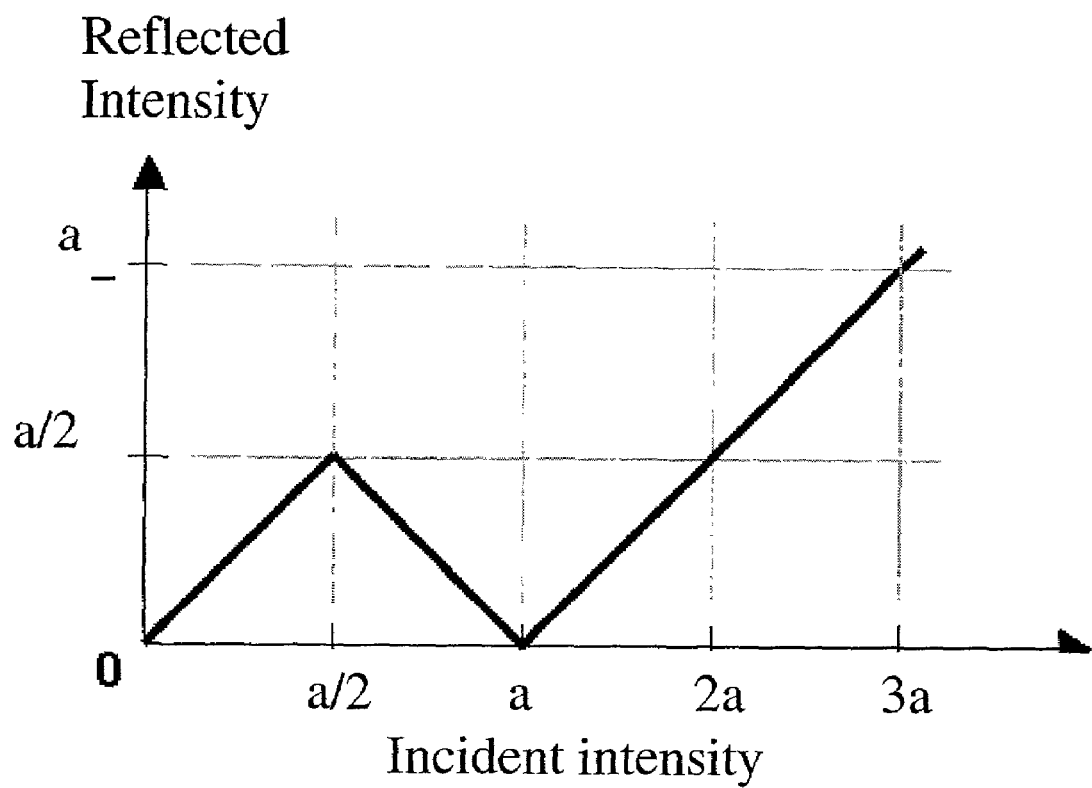
FIG. 41 is a plot of reflected intensity as a function of incident intensity, both in normalized units, as calculated for a structure shown in FIG. 38, for long-device.

For the purpose of illustration we show the idealized long-structure transfer curves in FIGS. 40 and 41. We plot them in terms of a normalized parameter a defined as:

$$I = a = \frac{n_{01} - n_{02}}{|n_{nl1}| + |n_{nl2}|}$$

The three regimes of transmittance, 0 to a/2 (I/2), a/2 (I/2) to a, and a+(I+), are well visible on these two curves. For convenience, the transfer function of the reflected intensity shown in FIG. 41 is referred to as the N-curves.

Figure 42:
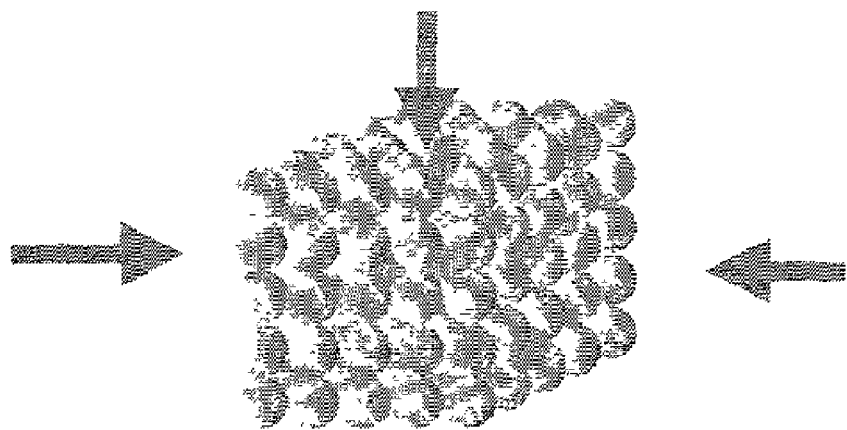
FIG. 42 is a schematic cross sectional view of an alternate embodiment of the present invention in which an optical crystal comprising cores and inter-core material having opposite Kerr coefficients and different linear indices.

Referring now to FIG. 42, alternate embodiments of the present invention employ an optical limiter device fabricated as an optical crystal. In accordance with the optical crystal embodiments, nanoscale zones, such as spheres, are made out of a first nonlinear material transparent at the wavelength region of interest. Spheres are prepared in either pure core or core-shell configuration. In the case of a lattice structure of pure cores, the crystal is infiltrated with a second liquid nonlinear material. The two materials have Kerr coefficients of substantially equal absolute value and opposite sign, and different linear indices.

In the core-shell arrangement of FIG. 42, the shell material is the second nonlinear material and has a lower glass transition temperature ($T_g$) than the core material. Upon heating above $T_g$ of the shells, but below $T_g$ of the cores, the shells melt and uniformly fill the spacing between spheres. Optical-crystals may be designed to provide all-optical signal processing for multiple directions of incidence or polarization.

Figure 43:
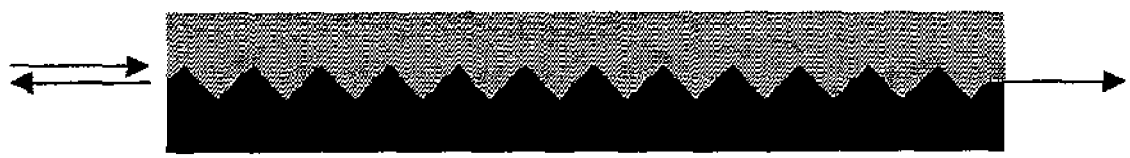
FIG. 43 shows a distributed feedback two-layer grating configuration for an optical limiter in accordance with another alternate embodiment of the present invention.

Referring now to FIG. 43, yet other embodiments of the present invention create a first grating in a first material and then coat first grating with a second material. The two materials have Kerr coefficients of substantially equal absolute value and opposite sign, and different linear indices. Light propagating along the waveguide, designated generally by numeral induces index changes in both nonlinear materials. The propagating light experiences an effective periodic medium and behaves qualitatively as in the device described above with reference to FIG. 38.

For all of the above configurations wavelength tuning may be obtained by using the electro-optic properties of materials. If the two materials possess similar electro-optic properties, i.e. a Pockels or Kerr coefficient of the same sign, the application of a DC electric field will control the wavelength selectivity. If the two materials possess dissimilar electro-optic properties, i.e. a Pockels or Kerr coefficient of opposite sign, the application of a DC electric field will control the a parameter and the intensity-dependent profile of the S and N curves.

In order for the devices to be useful in optical-signal processing applications, the response time of the materials making up the device are preferably on the picosecond scale, however materials of slower response are also within the scope of the present invention. Materials possessing nonlinear effects that satisfy speed requirements as well as Stegeman figures of merit, indicative of the ratio of optical nonlinearity to absorption, have been reported in the literature. Doped semiconductors, organic polymeric materials, photorefractive crystals, and various composites may have suitable nonlinear properties. Examples of materials that may be tailored to satisfy the requisite parameters are discussed, for example, Sutherland, *Handbook of Nonlinear Optics*.

In addition to providing characteristic transmittance curves, the described optical devices can be used as fundamental building blocks of a wide range of optical devices. Specifically, the characteristic shapes of the N and S curves allow design of a whole array of optical devices and systems. Some exemplary optical devices and systems are discussed below.

Optical Logic Devices

All-optical logic devices are able to process information optically without the need to convert the information to an electronic form for processing electronically.

All-optical logic devices typically either continue to rely on electronic carrier transitions, such as those which rely on semiconductor optical amplifiers, (U.S. Pat. No. 5,999,283) or diode/laser/LED/SEED/variable transmission combinations, (U.S. Pat. Nos. 4,128,300, 4,764,889), consist of non-integrable systems, (U.S. Pat. Nos. 4,932,739, 4,962,987, 4,992,654, 5,078,464, 5,144,375, 5,655,039, 5,831,731) narrowly defined devices which can only perform a single operation, (U.S. Pat. Nos. 5,31,5422, 5,831,731), extremely slow devices (U.S. Pat. No. 6,005,791) or other interference effect devices (U.S. Pat. Nos. 4,262,992, 5,623,366). The devices that use carriers do not circumvent the fundamental limit, although they do allow this limit to be more closely approached. These devices are most useful when only the fast components of the nonlinearity are sampled, such as are done in time division demultiplexers. The non-integrable systems, although interesting laboratory experiments and good proofs-of-concept, are not practical for commercial application. The narrowly defined, but integrable, devices do not have the flexibility to enable large scale integration, and since they typically rely on a loss mechanism, such as coupling to a radiative mode, are not efficient for multiple levels of switching.

The all-optical logic devices of the present invention are based on stable non-absorbing optical hard limiters as described herein. Typically, these stable non-absorbing optical hard limiters consist of alternating layers of materials with different linear indices and oppositely signed Kerr coefficients. This construction maintains the center of the stopband in generally the same spectral location, thereby providing stability. The linear and non-linear indices of the layers are such that the material with the lower linear index has a positive Kerr coefficient and the material with the higher linear index has a negative Kerr coefficient. Devices with these properties typically exhibit three regimes of operation, specifically a first regime bounded by input intensities from $0$ to $I1$ in which the signal is completely reflected, a second regime bounded by input intensities from $I1$ to $I2$ in which the transmitted signal increases and the reflected signal decreases as intensity increases, and a third regime above input intensity $I2$ in which all light above a certain level is reflected. The existence of these three regimes enables these devices to be used in optical logic applications. As the nonideality of the device increases, the curve is smoothed. For these devices, $I2$ is defined as the input intensity at which the built-in optical grating has disappeared completely, and $I1$ is defined as half of $I2$. In various embodiments of the present invention, intensity $I2$ represents a logic one (high), and intensity zero represents a logic zero (low).

FIG. 1 shows a "black box" view of an exemplary optical hard limiter 100. The optical hard limiter 100 outputs a transmitted signal and a reflected signal based upon the intensity of an input signal.

FIG. 2A shows the idealized transmitted transfer characteristics 200 of the optical hard limiter 100. As shown, the transmitted signal is zero for input signals from zero to $I1$. The transmitted signal increases from zero to $I2$ as the input signal increases from $I1$ to $I2$. The transmitted signal is limited to $I2$ for input signals above $I2$.

Figure 2B:
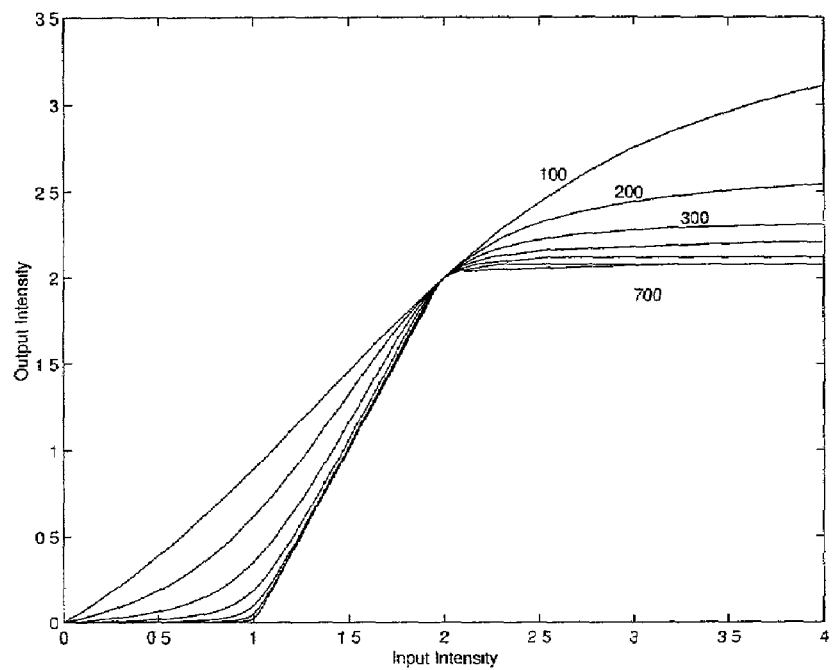
FIG. 2B is a graph showing the simulated transmitted transfer functions for finite optical hard limiters with different numbers of layers in accordance with an embodiment of the present invention.

In actuality, the transmitted transfer characteristics of the optical hard limiter 100 generally differ from the idealized transmitter transfer characterstics 200 shown in FIG. 2A, and depend upon the number of layers in the optical hard limiter 100. FIG. 2B shows simulated transmitted transfer characteristics 210 for finite devices having different numbers of layers. Devices with more layers approach the piecewise linear behavior of the idealized transmitted transfer characteristics 200 shown in FIG. 2A.

Figure 3:
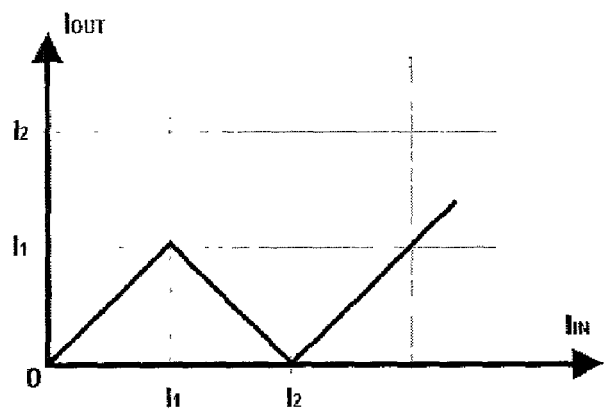
FIG. 3 is a graph showing the idealized reflected transfer function of an optical hard limiter in accordance with an embodiment of the present invention.

FIG. 3 shows the idealized reflected transfer characteristics 300 of the optical hard limiter 100. As shown, the reflected signal increases from zero to $I1$ as the input signal increases from zero to $I1$. The reflected signal decreases from $I1$ to zero as the input signal increases from $I1$ to $I2$. The reflected signal increases as the input signal increases above $I2$.

As with the transmitted transfer characteristics, the actual reflected transfer characteristics of the optical hard limiter 100 generally differ from the idealized reflected transfer characterstics 300 shown in FIG. 3, and depend upon the number of layers in the optical hard limiter 100. Simulated reflected transfer characteristics for finite devices having different numbers of layers are omitted for convenience.

Various all-optical logic devices make use of the transmitted signal and/or the reflected signal of one or more optical hard limiters. Furthermore, various all-optical logic devices can be combined to form additional all-optical logic devices and circuits. A number of exemplary all-optical logic devices based on stable non-absorbing optical hard limiters are described below. It should be noted that other all-optical logic devices can be formed, and the present invention is not limited to the devices shown or to any particular devices. It will be apparent to a skilled artisan how other all-optical logic devices can be formed using the described all-optical logic devices.

It should be noted that, in the described all-optical logic devices, signals are often combined in some proportion using a coupler that is external to the optical hard limiter. The described all-optical logic devices are based on a coupler that reduces the signal intensity by half. It should be noted, however, that the present invention is not limited to the use of such couplers or to couplers that reduce the signal intensity by half.

Figure 4:
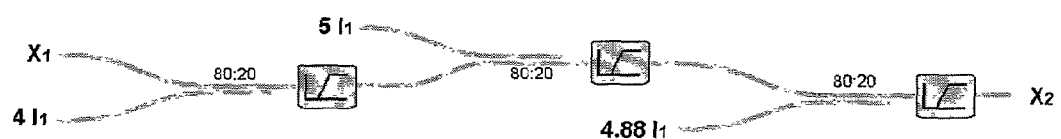
FIG. 4 is a schematic block diagram showing an optical gain element in accordance with an embodiment of the present invention.
Figure 5:
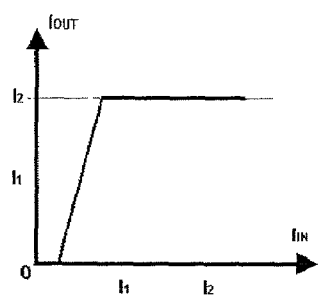
FIG. 5 is a graph showing the idealized transfer function of an optical gain element in accordance with an embodiment of the present invention.

A gain device converts an input signal from $\{0, I1\}$ to an output signal from $\{0, I2\}$. FIG. 4 shows an exemplary all-optical gain device 400 that is created using the transmission characteristics of three optical hard limiters connected in series. The all-optical gain device converts an input signal X1 from $\{0, I1\}$ to an output signal X2 from $\{0, I2\}$. FIG. 5 shows the idealized transfer function 500 of the exemplary gain device 400.

An AND gate outputs a logic one (high) if and only if both inputs are logic one (high) and otherwise outputs a logic zero (low). FIG. 6 shows an exemplary all-optical AND gate 600 that is created using the transmission characteristics of a single optical hard limiter. Inputs X2 and Y2 are combined, and the combined input is fed into an optical hard limiter. The transmitted signal of the optical hard limiter is used as the output of the all-optical AND gate 600. The following table shows the combined input to the limiter and the transmitter signal output of the limiter for the various input signal combinations:

| Input X2 | Input Y2 | Combined input to limiter | Transmitted signal output |
| --- | --- | --- | --- |
| 0 | 0 | 0 | 0 |
| 0 | I2 | I1 | 0 |
| I2 | 0 | I1 | 0 |
| I2 | I2 | I2 | I2 |

When the input signal X2 is zero (low) and the input signal Y2 is zero (low), the combined input to the limiter is zero (low). The transmitted signal output of the limiter is zero (low) when the input to the limiter is zero (low). Therefore, the output of the all-optical AND gate is zero (low).

When the input signal X2 is zero (low) and the input signal Y2 is one (high), the combined input to the limiter is I1. The transmitted signal output of the limiter is zero (low) when the input to the limiter is I1. Therefore, the output of the all-optical AND gate is zero (low).

When the input signal X2 is one (high) and the input signal Y2 is zero (low), the combined input to the limiter is I1. The transmitted signal output of the limiter is zero (low) when the input to the limiter is I1. Therefore, the output of the all-optical AND gate is zero (low).

When the input signal X2 is one (high) and the input signal Y2 is one (high), the combined input to the limiter is I2. The transmitted signal output of the limiter is one (high) when the input to the limiter is I2. Therefore, the output of the all-optical AND gate is one (high).

An OR gate outputs a logic one (high) if either or both inputs are logic one (high) and otherwise outputs a logic zero (low). FIG. 7 shows an exemplary all-optical OR gate 700 that is created using the all-optical gain device 400. Inputs X2 and Y2 are combined, and the combined input is fed into a gain element 400. The output of the gain element 400 is used as the output of the all-optical OR gate 700. The following table shows the combined input to the gain element 400 and the gain element output for the various input signal combinations:

| Input X2 | Input Y2 | Combined input to gain element | Gain element output |
|---|---|---|---|
| 0 | 0 | 0 | 0 |
| 0 | I2 | I1 | I2 |
| I2 | 0 | I1 | I2 |
| I2 | I2 | I2 | I2 |

When the input signal X2 is zero (low) and the input signal Y2 is zero (low), the combined input to the gain element is zero (low). The gain element outputs a zero (low) when its input is zero (low). Therefore, the output of the all-optical OR gate is zero (low).

When the input signal X2 is zero (low) and the input signal Y2 is one (high), the combined input to the gain element is I1. The gain element outputs a one (high) when its input is I1. Therefore, the output of the all-optical OR gate is one (high).

When the input signal X2 is one (high) and the input signal Y2 is zero (low), the combined input to the gain element is I1. The gain element outputs a one (high) when its input is I1. Therefore, the output of the all-optical OR gate is one (high).

When the input signal X2 is one (high) and the input signal Y2 is one (high), the combined input to the gain element is I2. The gain element outputs a one (high) when its input is I2. Therefore, the output of the all-optical OR gate is one (high).

An XOR (exclusive-OR) gate outputs a logic one (high) if either one but not both inputs are a logic one (high) and otherwise outputs a logic zero (low). FIG. 8 shows an exemplary all-optical XOR gate 800 that is created using the reflected signal of an optical hard limited in series with an all-optical gain device 400. Inputs X2 and Y2 are combined, and the combined input is fed into an optical hard limiter. The reflected signal of the optical hard limiter is fed into a gain element 400. The output of the gain element 400 is used as the output of the all-optical XOR gate 800. The following table shows the combined input to the limiter, the reflected signal output to the gain element 400, and the gain element output for the various input signal combinations:

| Input X2 | Input Y2 | Combined input to limiter | Reflected signal output to gain element | Gain element output |
|---|---|---|---|---|
| 0 | 0 | 0 | 0 | 0 |
| 0 | I2 | I1 | I1 | I2 |
| I2 | 0 | I1 | I1 | I2 |
| I2 | I2 | I2 | 0 | 0 |

When the input signal X2 is zero (low) and the input signal Y2 is zero (low), the combined input to the limiter is zero (low). The reflected signal output of the limiter is zero (low) when the input to the limiter is zero (low). The gain element outputs a zero (low) when its input is zero (low). Therefore, the output of the all-optical XOR gate is zero (low).

When the input signal X2 is zero (low) and the input signal Y2 is one (high), the combined input to the limiter is I1. The reflected signal output of the limiter is I1 when the input to the limiter is I1. The gain element outputs a one (high) when its input is I1. Therefore, the output of the all-optical XOR gate is one (high).

When the input signal X2 is one (high) and the input signal Y2 is zero (low), the combined input to the limiter is I1. The reflected signal output of the limiter is I1 when the input to the limiter is I1. The gain element outputs a one (high) when its input is I1. Therefore, the output of the all-optical XOR gate is zero (low).

When the input signal X2 is one (high) and the input signal Y2 is one (high), the combined input to the limiter is I2. The reflected signal output of the limiter is zero (low) when the input to the limiter is I2. The gain element outputs a zero (low) when its input is zero (low). Therefore, the output of the all-optical AND gate is one (high).

A NOT gate outputs a logic one (high) if a single input is a logic zero (low) and outputs a logic zero (low) if the single input is a logic one (high). FIG. 9 shows an exemplary all-optical NOT gate 900 that is created using the reflected signal of an optical hard limited in series with an all-optical gain device 400. The all-optical NOT gate 900 is a special case of the all-optical XOR gate 800 in which the input Y2 is fixed at a logic one (high). Without further explanation, the following table shows the combined input to the limiter, the reflected signal output to the gain element 400, and the gain element output for the various input signal combinations:

| Input X2 | Fixed input I2 | Combined input to limiter | Reflected signal output to gain element | Gain element output |
|---|---|---|---|---|
| 0 | I2 | I1 | I1 | I2 |
| I2 | I2 | I2 | 0 | 0 |

Additional all-optical logic gates and circuits can be formed using the transmitted and reflected signals of the optical hard limiter. Furthermore, the all-optical logic gates described above can be used as building blocks to form additional all-optical logic gates and circuits.

Figure 10:
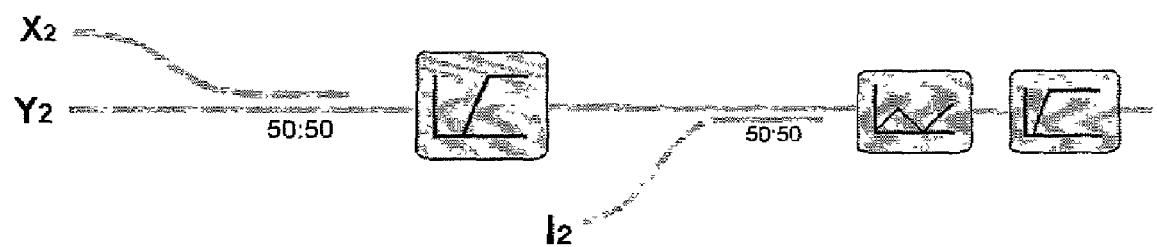
FIG. 10 is a schematic block diagram showing an optical NAND gate in accordance with an embodiment of the present invention.

FIG. 10 shows an all-optical NAND gate 1000 formed by coupling the output of an all-optical AND gate 600 as the input to an all-optical NOT gate 900.

Figure 11:
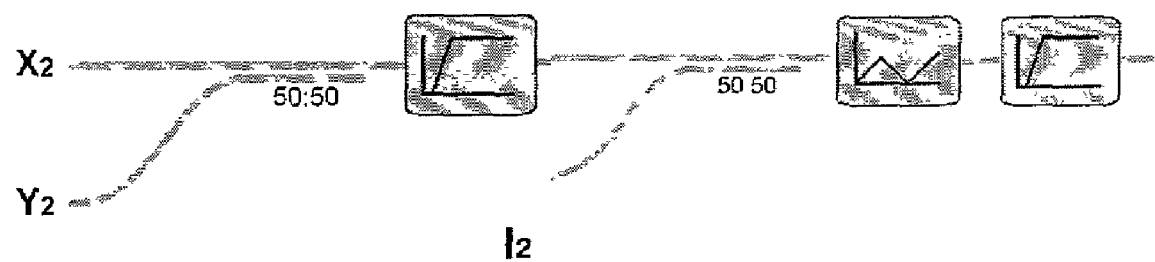
FIG. 11 is a schematic block diagram showing an optical NOR gate in accordance with an embodiment of the present invention.

FIG. 11 shows an all-optical NOR gate 1100 formed by coupling the output of an all-optical OR gate 700 as the input to an all-optical NOT gate 900.

Optical Sampler

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

Optical information processing systems process information optically without the need to convert the information to an electronic form for processing electronically. One challenge in an optical information processing is the storage of an optical signal. Traditionally, storage of an optical signal would be accomplished by detecting the signal with a photodetector, converting it into excited carriers, and then storing these excited carriers electronically. This technique for storing optical signals is limited by the speed of the electronics and becomes unsatisfactory as optical communication speeds increase.

Thus, optical information processing systems need to store an optical signal in the optical state. The use of bistable devices to store optical signals has been explored (U.S. Pat. Nos. 4,573,767, 4,930,873, 5,349,593, 5,461,507, 5,537,243), and the use of stable devices with feedback has also been examined(U.S. Pat. Nos. 5,617,232, 5,999,284). As well, devices which store information as a chemical reaction have been patented (U.S. Pat. Nos. 4,864,536, 4,992,654, 5,479,384, 6,005,791).

In an embodiment of the present invention, an optical sampler stores an optical signal in the optical state. The optical sampler is based on stable, non-absorbing optical hard limiters as described herein. Various optical logic devices based on stable, non-absorbing optical hard limiters that may be used as components of the optical sampler are described above.

An exemplary optical sampler is described. The exemplary optical sampler has a layout similar to an electronic D-type flip-flop and works in a similar manner, although it should be noted that the signals processed by the optical sampler are optical signals that are reduced by approximately one half when split. As with a typical D-type flip-flop, an optical input signal is sampled (latched) based upon a clock signal. The sampled optical input signal is stored by placing the sampled optical input signal in an optical feedback loop. The optical feedback loop provides appropriate amplification/regeneration of the sampled optical input signal. The sampled and stored optical input signal is used to generate an output signal equal to the optical input signal. Once the optical input signal is sampled, the output signal is latched to the optical input signal, and does not change until a new optical input signal is sampled regardless of the state of the optical input signal.

Figure 12:
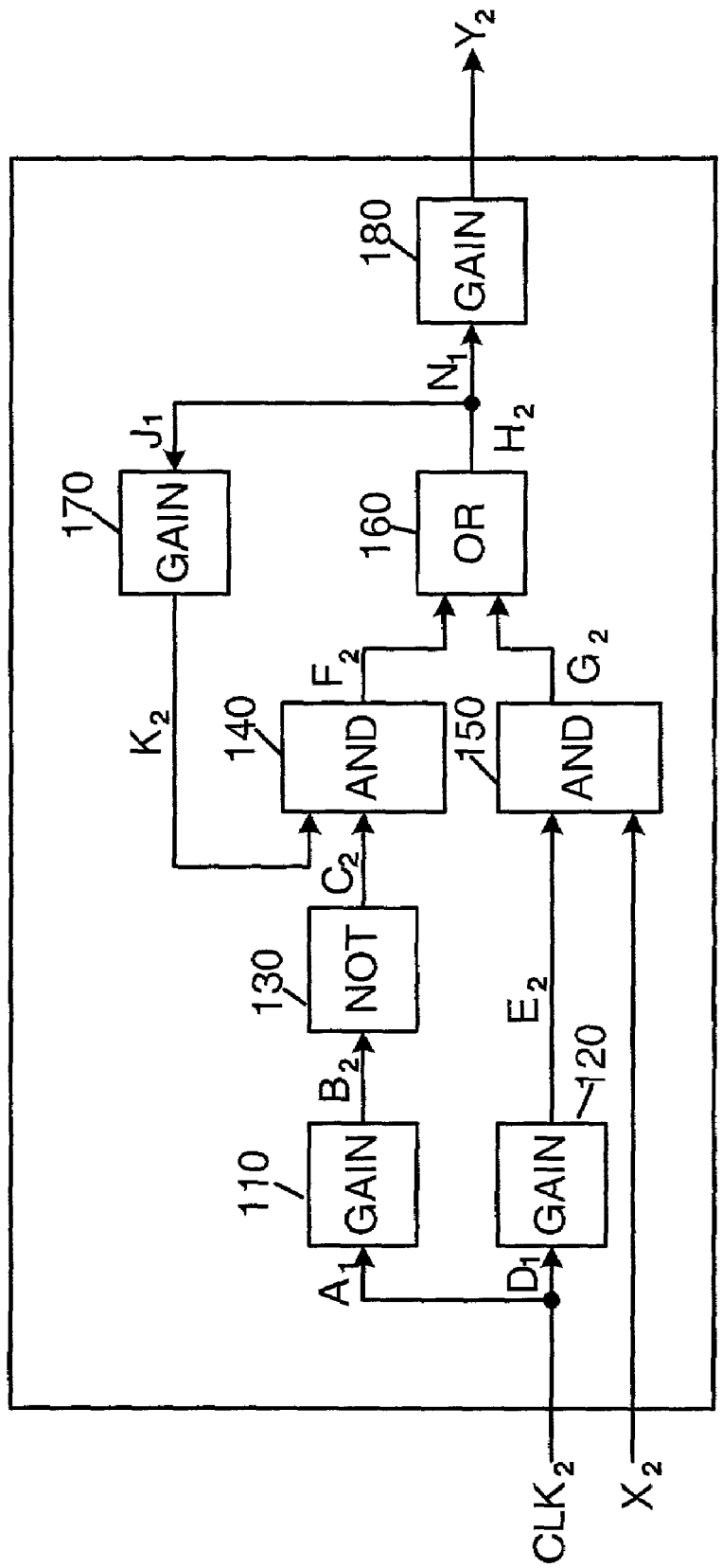
FIG. 12 is a schematic block diagram showing a first exemplary optical sampler built from optical logic gates based upon stable, non-absorbing optical hard limiters for use with input/output signals in a range $\{0, I2\}$ in accordance with an embodiment of the present invention.

FIG. 12 is a conceptual schematic block diagram showing an exemplary optical sampler 1200 built from various optical logic gates described above. It should be noted that all input, output, and intermediate signals are optical. In this embodiment, input and output signals are in the range $\{0, I2\}$. It should also be noted that certain optical signals are split into two branches, which reduces the signal strength by approximately one half on each branch. Therefore, some intermediate signals are in the range $\{0, I2\}$, while other intermediate signals are in the range $\{0, I1\}$. For convenience, signals in the range $\{0, I1\}$ are denoted by a number 1, while signals in the range $\{0, I2\}$ are denoted by a number 2. The direction of photon propagation is indicated with arrows.

The optical sampler 1200 includes, among other things, optical gain element 110, optical gain element 120, optical NOT gate 130, optical AND gate 140, optical AND gate 150, optical OR gate 160, optical gain element 170, and optical gain element 180. The optical sampler 1200 has two inputs, namely a clock signal CLK2 and an input signal X2, and one output, namely output signal Y2. All input and output signals are in the range $\{0, I2\}$.

The clock signal CLK2 is split into signals A1 and D1.

The signal A1 is coupled to the input of the optical gain element 110. The optical gain element 110 converts the signal A1 in the range $\{0, I1\}$ into signal B2 in the range $\{0, I2\}$. The signal B2 from the optical gain element 110 is coupled to the input of the optical NOT gate 130. The signal C2 from the optical NOT gate 130 is coupled to one input of the optical AND gate 140.

The signal D1 is coupled to the input of the optical gain element 120. The optical gain element 120 converts the signal D1 in the range $\{0, I1\}$ into signal E2 in the range $\{0, I2\}$. The signal E2 from the optical gain element 120 is coupled to one input of the optical AND gate 150, while the input signal X2 is coupled to the other input of the optical AND gate 150.

The signal F2 from the optical AND gate 140 is coupled to one input of the optical OR gate 160, while the signal G2 from the optical AND gate 150 is coupled to the other input of the optical OR gate 160.

The signal H2 from the optical OR gate 160 is split into signals N1 and J1.

The signal N1 is coupled to the input of the optical gain element 180. The optical gain element 180 converts the signal Ni in the range $\{0, I1\}$ into the output signal Y2 in the range $\{0, I2\}$.

The signal J1 is coupled to the input of the optical gain element 170. The optical gain element 170 converts the signal J1 in the range $\{0, I1\}$ into signal K2 in the range $\{0, I2\}$. The signal K2 from the optical gain element 170 is coupled to the other input of the optical AND gate 140.

When the clock signal CLK2 is I2 (high), the optical AND gate 150 is essentially activated, while the optical AND gate 140 is deactivated. In this state, the optical AND gate 150 feeds the input signal X2 to the optical OR gate 160 as signal G2, while the optical AND gate 140 feeds a zero signal to the optical OR gate 160 as signal F2. The optical OR gate 160 in turn outputs signal H2 equal to the input signal X2. The signal H2 is split into signals I1 and J1. The signal I1 is amplified by the optical gain element 180 in order to produce the output signal Y2 equal to the input signal X2. The signal J1 is amplified by the optical gain element 170 to produce looped back signal K2 equal to the input signal X2, which is fed into the optical AND gate 140.

When the clock signal CLK2 transitions to zero (low), the optical AND gate 150 is essentially deactivated, while the optical AND gate 140 is activated. In this state, the optical AND gate 140 feeds the looped back signal K2 to the optical OR gate 160 as signal F2. The optical OR gate 160 in turn outputs signal H2 equal to the looped back signal K2. The signal H2 is split into signals I1 and J1. The signal I1 is amplified by the optical gain element 180 in order to produce the output signal Y2 equal to the looped back signal K2. The signal J1 is amplified by the optical gain element 170 to reproduce looped back signal K2, which is fed into the optical AND gate 140.

Thus, when the clock signal CLK2 transitions from I2 (high) to zero (low), the optical input signal X2 is sampled (latched) so that the output signal Y2 is driven to, and remains at, the sampled input signal regardless of the state of the optical input signal X2 so long as the clock signal CLK2 remains zero (low). The sampled input signal is essentially stored in the feedback loop consisting of the optical AND gate 140, the signal F2, the optical OR gate 160, the signal H2, the signal J1, the optical gain element 170, and the signal K2.

It should be noted that, in the described embodiment, there is an inherent delay in the feedback loop that eliminates the need for falling/rising edge triggers that are needed in a traditional electronic D-type flip-flop. Without this inherent delay, simultaneous high-to-low transitions on both the clock signal CLK2 and the input signal X2 would generally cause a glitch on the output signal Y2. By eliminating the falling/rising edge triggers, this inherent delay greatly simplifies the optical sampler 1200. It should be noted, however, that appropriate falling/rising edge triggers can be added to a particular optical sampler embodiment if there is an insufficient amount of inherent delay in its feedback loop.

Figure 13:
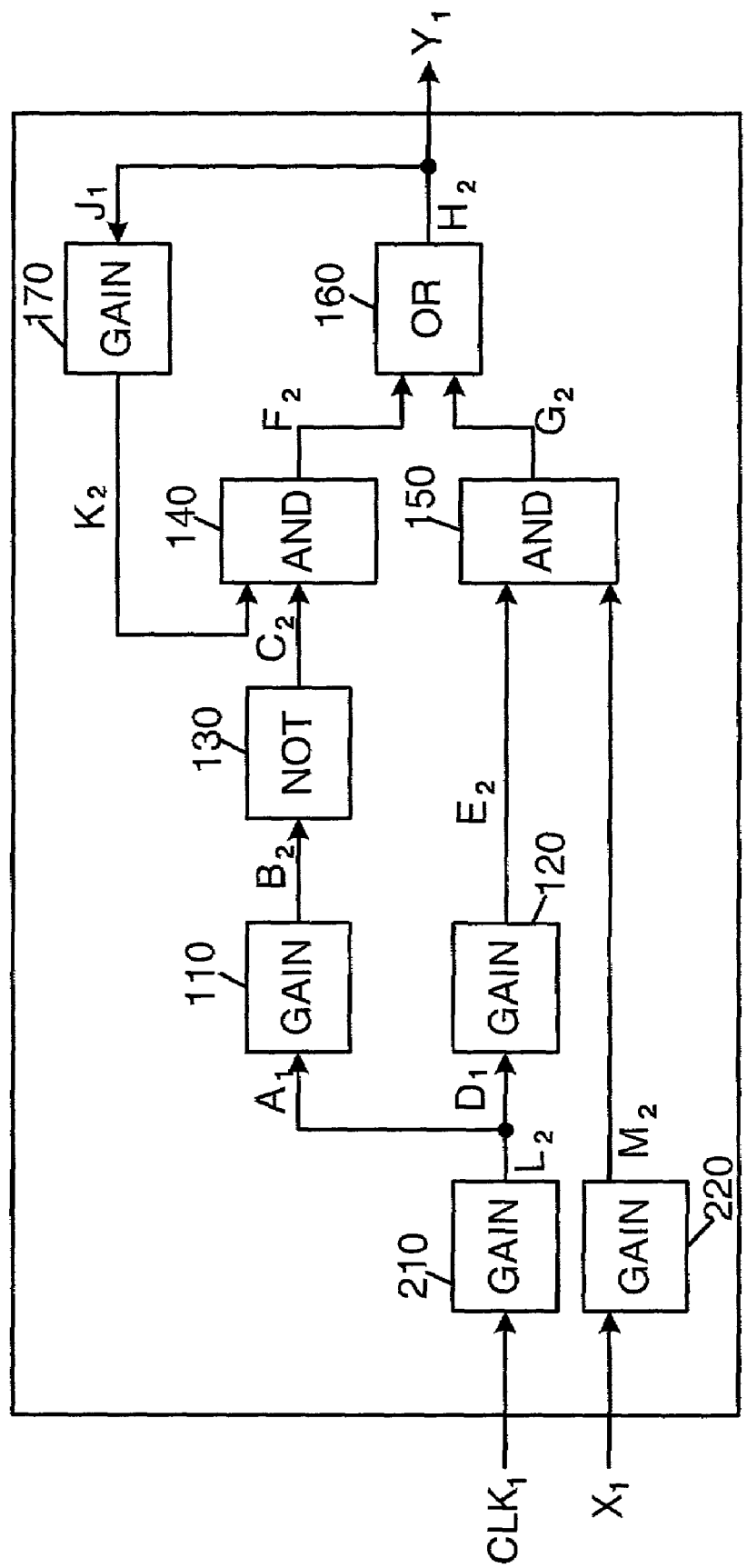
FIG. 13 is a schematic block diagram showing a second exemplary optical sampler built from optical logic gates based upon stable, non-absorbing optical hard limiters for use with input/output signals in a range $\{0, I1\}$ in accordance with an embodiment of the present invention.

FIG. 13 is a conceptual schematic block diagram showing an exemplary optical sampler 1300 built from various optical logic gates described above. It should be noted that all input, output, and intermediate signals are optical. In this embodiment, input and output signals are in the range {0, I1}. It should also be noted that certain optical signals are split into two branches, which reduces the signal strength by approximately one half on each branch. Therefore, some intermediate signals are in the range {0, I2}, while other intermediate signals are in the range {0, I1}. For convenience, signals in the range {0, I1} are denoted by a number 1, while signals in the range {0, I2} are denoted by a number 2. The direction of photon propagation is indicated with arrows.

The optical sampler 1300 includes, among other things, optical gain element 110, optical gain element 120, optical NOT gate 130, optical AND gate 140, optical AND gate 150, optical OR gate 160, optical gain element 170, optical gain element 210, and optical gain element 220. The optical sampler 1300 has two inputs, namely a clock signal CLK1 and an input signal X1, and one output, namely output signal Y1. All input and output signals are in the range {0, I1}.

The clock signal CLK1 is coupled to the input of the optical gain element 210. The optical gain element 210 converts the signal CLK1 in the range {0, I1} into signal L2 in the range {0, I2}. The signal L2 is split into signals A1 and D1.

The signal A1 is coupled to the input of the optical gain element 110. The optical gain element 110 converts the signal A1 in the range {0, I1} into signal B2 in the range {0, I2}. The signal B2 from the optical gain element 110 is coupled to the input of the optical NOT gate 130. The signal C2 from the optical NOT gate 130 is coupled to one input of the optical AND gate 140.

The signal D1 is coupled to the input of the optical gain element 120. The optical gain element 120 converts the signal D1 in the range {0, I1} into signal E2 in the range {0, I2}. The signal E2 from the optical gain element 120 is coupled to one input of the optical AND gate 150.

The input signal X1 is coupled to the input of the optical gain element 220. The optical gain element 220 converts the input signal X1 in the range {0, I1} into signal M2 in the range {0, I2}. The signal M2 is coupled to the other input of the optical AND gate 150.

The signal F2 from the optical AND gate 140 is coupled to one input of the optical OR gate 160, while the signal G2 from the optical AND gate 150 is coupled to the other input of the optical OR gate 160.

The signal H2 from the optical OR gate 160 is split into output signal Y1 and signal J1.

The signal J1 is coupled to the input of the optical gain element 170. The optical gain element 170 converts the signal J1 in the range {0, I1} into signal K2 in the range {0, I2}. The signal K2 from the optical gain element 170 is coupled to the other input of the optical AND gate 140.

When the clock signal CLK1 is I1, the optical AND gate 150 is essentially activated, while the optical AND gate 140 is deactivated. In this state, the optical AND gate 150 feeds the signal M2 to the optical OR gate 160 as signal G2, while the optical AND gate 140 feeds a zero signal to the optical OR gate 160 as signal F2. The optical OR gate 160 in turn outputs signal H2 equal to the signal M2. The signal H2 is split into output signal Y1 and signal J1. The signal J1 is amplified by the optical gain element 170 to produce looped back signal K2 equal to the signal M2, which is fed into the optical AND gate 140.

When the clock signal CLK1 transitions to zero, the optical AND gate 150 is essentially deactivated, while the optical AND gate 140 is activated. In this state, the optical AND gate 140 feeds the looped back signal K2 to the optical OR gate 160 as signal F2. The optical OR gate 160 in turn outputs signal H2 equal to the looped back signal K2. The signal H2 is split into output signal Y1 and signal J1. The signal J1 is amplified by the optical gain element 170 to reproduce looped back signal K2, which is fed into the optical AND gate 140.

Thus, when the clock signal CLK1 transitions from I1 to zero, the optical input signal X1 is sampled (latched) so that the output signal Y1 is driven to, and remains at, the sampled input signal regardless of the state of the optical input signal X1 so long as the clock signal CLK1 remains zero. The sampled input signal is essentially stored in the feedback loop consisting of the optical AND gate 140, the signal F2, the optical OR gate 160, the signal H2, the signal J1, the optical gain element 170, and the signal K2.

It should be noted that, in the described embodiment, there is an inherent delay in the feedback loop that eliminates the need for falling/rising edge triggers that are needed in a traditional electronic D-type flip-flop. Without this inherent delay, simultaneous I1-to-zero transitions on both the clock signal CLK1 and the input signal X1 would generally cause a glitch on the output signal Y1. By eliminating the falling/rising edge triggers, this inherent delay greatly simplifies the optical sampler 1300. It should be noted, however, that appropriate falling/rising edge triggers can be added to a particular optical sampler embodiment if there is an insufficient amount of inherent delay in its feedback loop.

Optical Analog Noise Subtractor

In today's information age, optical communication technologies are being used more and more frequently for transmitting information at very high speeds. As with other types of communication technologies, the accumulation of noise along an optical communication channel degrades the signal-to-noise ratio and thus increases the bit error.

Generally speaking, noise can be removed by filtering out-of-band noise, which would not work when the noise is in the same band as the information, or by filtering in-band noise (U.S. Pat. Nos. 6,044,341, 6,041,126 for voice).

In an embodiment of the present invention, analog noise is subtracted from an optical communication channel using stable, non-absorbing optical hard limiters as described herein. Subtracting this extra signal at an extremely fast rate significantly improves the quality of the signal. The technique of the present invention is similar to re-shaping the signal, but is still effective even at extremely high noise levels.

FIG. 1 shows a "black box" view of an exemplary optical hard limiter 100. The optical hard limiter 100 outputs a transmitted signal and a reflected signal based upon the intensity of an input signal.

FIG. 2A shows the idealized transmitted transfer characteristics 200 of the optical hard limiter 100. As shown, the transmitted signal is zero for input signals from zero to I1. The transmitted signal increases from zero to I2 as the input signal increases from I1 to I2. The transmitted signal is limited to I2 for input signals above I2.

In actuality, the transmitted transfer characteristics of the optical hard limiter 100 generally differ from the idealized transmitter transfer characterstics 200 shown in FIG. 2A, and depend upon the number of layers in the optical hard limiter 100. FIG. 2B shows simulated transmitted transfer characteristics 210 for finite devices having different numbers of layers. Devices with more layers approach the piecewise linear behavior of the idealized transmitted transfer characteristics 200 shown in FIG. 2A.

FIG. 3 shows the idealized reflected transfer characteristics 300 of the optical hard limiter 100. As shown, the reflected signal increases from zero to I1 as the input signal increases from zero to I1. The reflected signal decreases from I1 to zero as the input signal increases from I1 to I2. The reflected signal increases as the input signal increases above I2.

As with the transmitted transfer characteristics, the actual reflected transfer characteristics of the optical hard limiter 100 generally differ from the idealized reflected transfer characterstics 300 shown in FIG. 3, and depend upon the number of layers in the optical hard limiter 100. Simulated reflected transfer characteristics for finite devices having different numbers of layers are omitted for convenience.

FIG. 14 is a table summarizing the relationship between the input signal INPUT, the transmitted signal ITRANSMITTED, and the reflected signal IREFLECTED of a stable, non-absorbing optical hard limiter. The transmitted signal is equal to zero for input intensities between zero and I1, two times the input signal minus I2 (i.e., 2*INPUT−I2) for input intensities between I1 and I2, and I2 for input intensities above I2. The reflected signal is equal to the input signal INPUT for input intensities between zero and I1, I2 minus the input signal (i.e., I2−INPUT) for input intensities between I1 and I2, and the input signal minus I2 (i.e., INPUT−I2) for input intensities above I2.

An exemplary optical noise subtractor operates as follows.

A reference signal B is combined with a control signal of intensity I2 through a 3 dB optical coupler, yielding a signal of intensity (B/2+I1). This signal is fed to a first optical hard limiter. Because the intensity of the signal (B/2+I1) falls substantially within the middle intensity region, the reflected signal is as follows:

$$IREFLECTED = I2 - \text{INPUT}$$
$$= I2 - (B/2 + I1)$$
$$= I1 - B/2$$

The information signal A is combined with a bias signal of intensity I2 through a 3 dB optical coupler, yielding a signal of intensity (A/2+I1). This signal is combined with the reflected signal from the first optical hard limiter through a 3 dB optical coupler, yielding a signal of intensity 0.5*(I1−B/2+A/2+I1). This signal is fed into a second optical hard limiter. Because the intensity of the signal 0.5*(I1−B/2+A/2+I1) falls substantially within the middle intensity region, the transmitted signal is as follows:

$$ITRANSMITTED = 2*\text{INPUT} - I2$$
$$= 2(0.25(A - B) + 0.5(I1 + I1)) - I2$$
$$= 0.5(A - B) + 2*I1 - 2*I1$$
$$= 0.5(A - B)$$

Thus, the optical noise subtractor effectively subtracts the analog noise from the optical conmmunication channel at the speed of the response of the various devices, with the trade-off of decreasing the intensity of the information signal by 3 dB.

Figure 15:
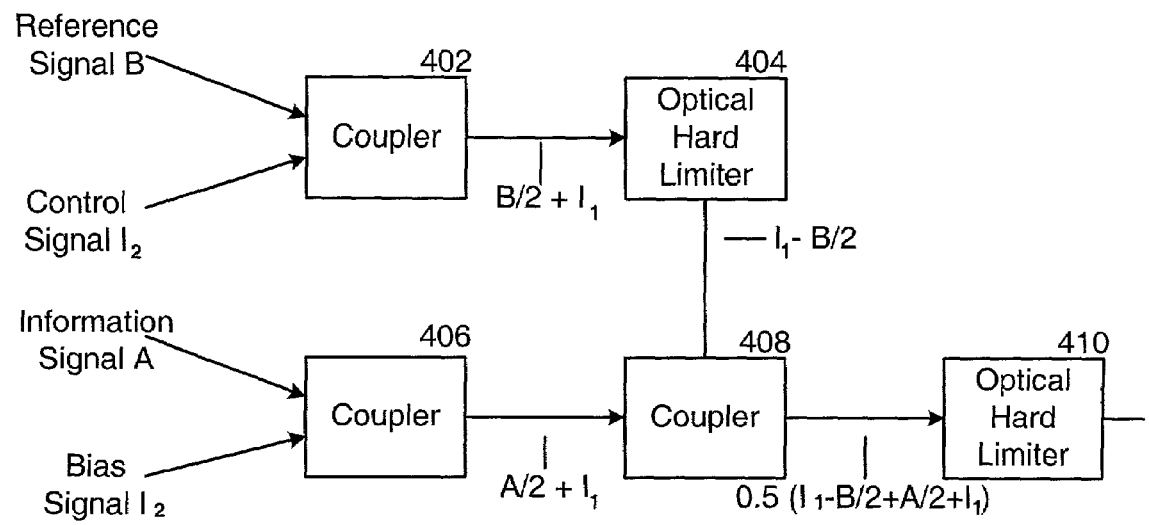
FIG. 15 is a schematic block diagram showing an exemplary optical noise subtractor in accordance with an embodiment of the present invention.

FIG. 15 is a schematic block diagram showing an exemplary optical noise subtractor 1500. Among other things, the optical noise subtractor 1500 includes optical couplers 402, 406, 408 and optical hard limiters 404, 410.

The optical coupler 402 receives the reference signal B and the control signal of intensity I2. The optical coupler 402 combines these signals and outputs a signal of intensity (B/2+I1).

The optical hard limiter 404 receives the signal of intensity (B/2+I1) from the optical coupler 402. The optical hard limiter 404 outputs a reflected signal of intensity (I1−B/2).

The optical coupler 406 receives the information signal A and the bias signal of intensity I2. The optical coupler 406 combines these signals and outputs a signal of intensity (A/2+I1).

The optical coupler 408 receives the reflected signal of intensity (I1−B/2) from the optical hard limiter 404 as well as the signal of intensity of (A/2+I1) from the optical coupler 406. The optical coupler 408 combines theses signals and outputs a signal of intensity 0.5(I1−B/2+A/2+I1).

The optical hard limiter 410 receives the signal of intensity 0.5(I1−B/2+A/2+I1) from the optical coupler 408. The optical hard limiter 410 outputs a transmitted signal of intensity 0.5(A−B), thus effectively subtracting the noise from the information signal.

In essence, then, the optical coupler 402 compresses the reference signal B in the range {0, I2} into a compressed reference signal in the range {I1, I2}, and the optical hard limiter 404 inverts the compressed reference signal to form an inverted compressed reference signal. Similarly, the optical coupler 406 compresses the information signal A in the range {0, I2} into a compressed information signal in the range {I1, I2}. The optical coupler 408 combines the inverted compressed reference signal and the compressed information signal to form a combined signal essentially subtracting the compressed reference signal from the compressed information signal. The optical hard limiter 410 expands the combined signal in the range {I1, I2} into a transmitted signal in the range {0, I2}.

Figure 16:
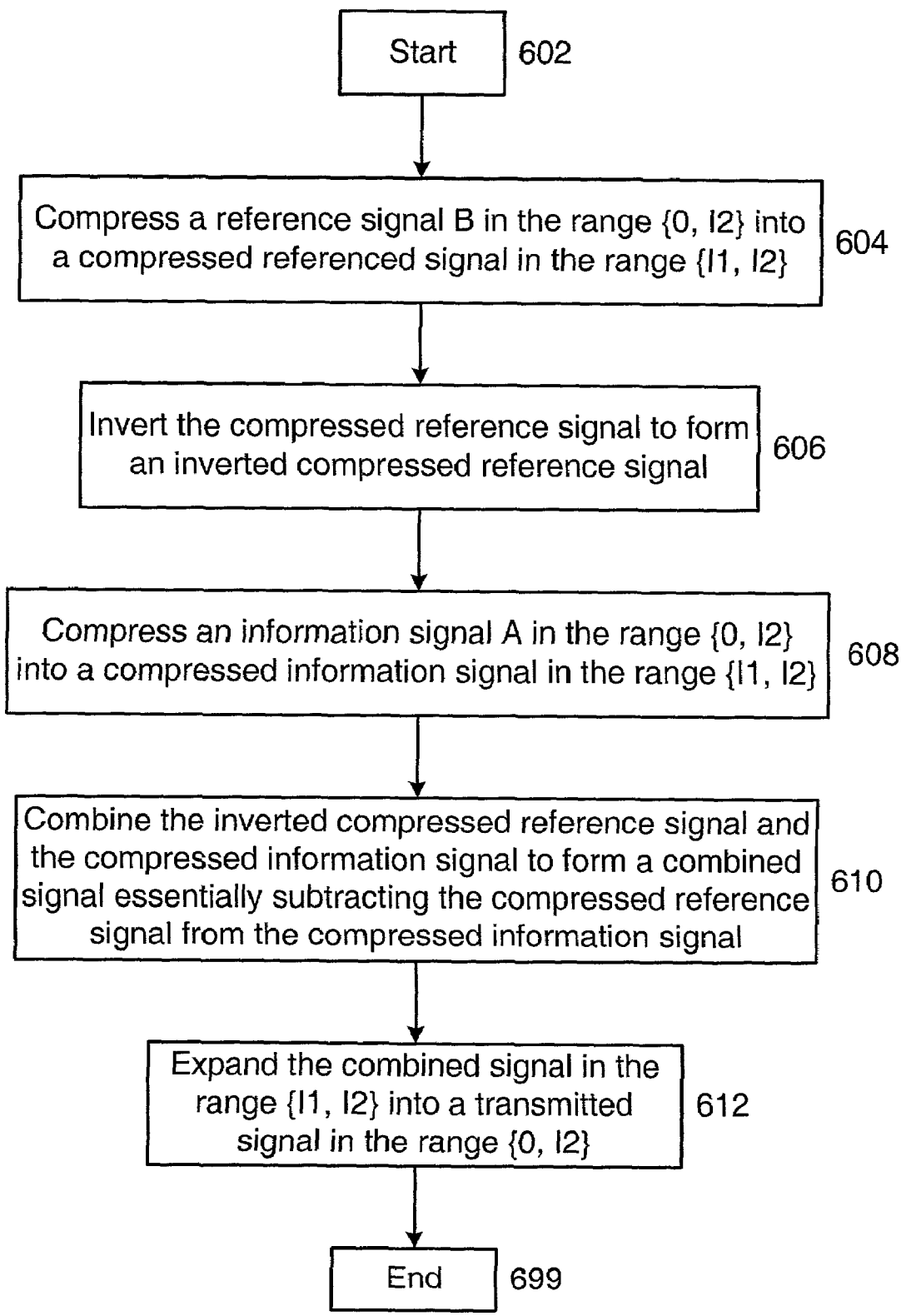
FIG. 16 is a logic flow diagram showing exemplary logic for subtracting analog noise from an optical communication channel using stable, non-absorbing optical hard limiters in accordance with an embodiment of the present invention.

FIG. 16 is a logic flow diagram showing exemplary logic 1600 for subtracting an analog signal from an optical communication channel using stable, non-absorbing optical hard limiters. Beginning at block 602, the logic compresses a reference signal B in the range {0, I2} into a compressed reference signal in the range {I1, I2}, in block 604. The logic inverts the compressed reference signal to form an inverted compressed reference signal, in block 606. The logic compresses an information signal A in the range {0, I2} into a compressed information signal in the range {I1, I2}, in block 608. The logic combines the inverted compressed reference signal and the compressed information signal to form a combined signal essentially subtracting the compressed reference signal from the compressed information signal, in block 610.

The logic expands the combined signal in the range {I1, I2} into a transmitted signal in the range {0, I2}, in block 612. The logic 600 terminates in block 699.

Optical Automatic Gain Control (AGC)

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

A communication channel can be used more efficiently to transmit information if an encoding scheme is used to assign binary values to discrete intensity levels. This is difficult in an optical communication system due to the difficulty in controlling the intensity of the signal due to attenuation in the optical fiber. Therefore, it is difficult to establish a reference intensity level for optical communications over the optical fiber.

Automatic gain control can be used to normalize packets of varying intensities. Automatic gain control for optical communications is often accomplished by detecting the optical signal, transforming the optical signal in an electronic signal, processing the signal electronically, converting the processed electronic signal back into an optical form, and retransmitting the converted optical signal. Unfortunately, this process is limited by the speed of the electronics.

In an embodiment of the present invention, optical automatic gain control (AGC) is accomplished using stable, non-absorbing optical hard limiters and various optical logic gates derived therefrom, as described above. The described AGC mechanism preserves the ratios between signal levels and provides an adjustable amount of gain.

In a typical embodiment of the present invention, AGC is accomplished by processing an optical input signal in one or more stages. In each stage, the output signal from the previous stage is amplified by a predetermined amount if and only if the intensity of the input signal is below a predetermined threshold. The threshold decreases in each successive stage, so that lower intensity input signals are amplified more than higher intensity input signals. This tends to reduce the dynamic range of the input signal. The optical output signal from the last stage may be amplified through a linear amplifier in order to compensate for signal losses in the various stages, which is primarily from signal splitting.

Figure 17:
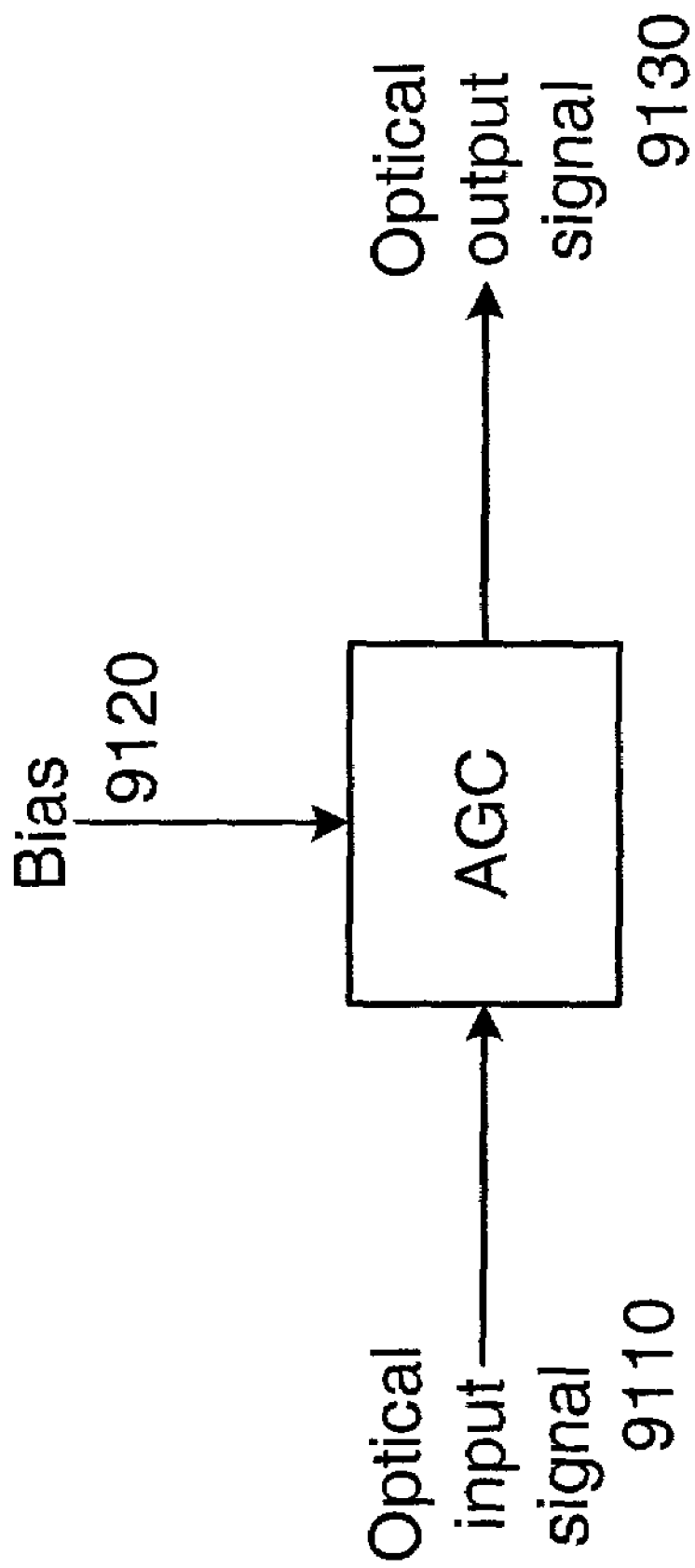
FIG. 17 is a block diagram showing an exemplary optical automatic gain controller in accordance with an embodiment of the present invention.

FIG. 17 shows an exemplary optical automatic gain controller (AGC) 9100. The optical AGC 9100 receives as inputs an optical input signal 9110 and a bias signal 9120 and generates optical output signal 9130. The optical input signal 9110 has a first intensity range and the optical output signal 9130 has a second intensity range less than the first intensity range. The bias signal 9120 is used to set the thresholds for the various AGC stages.

Figure 18:
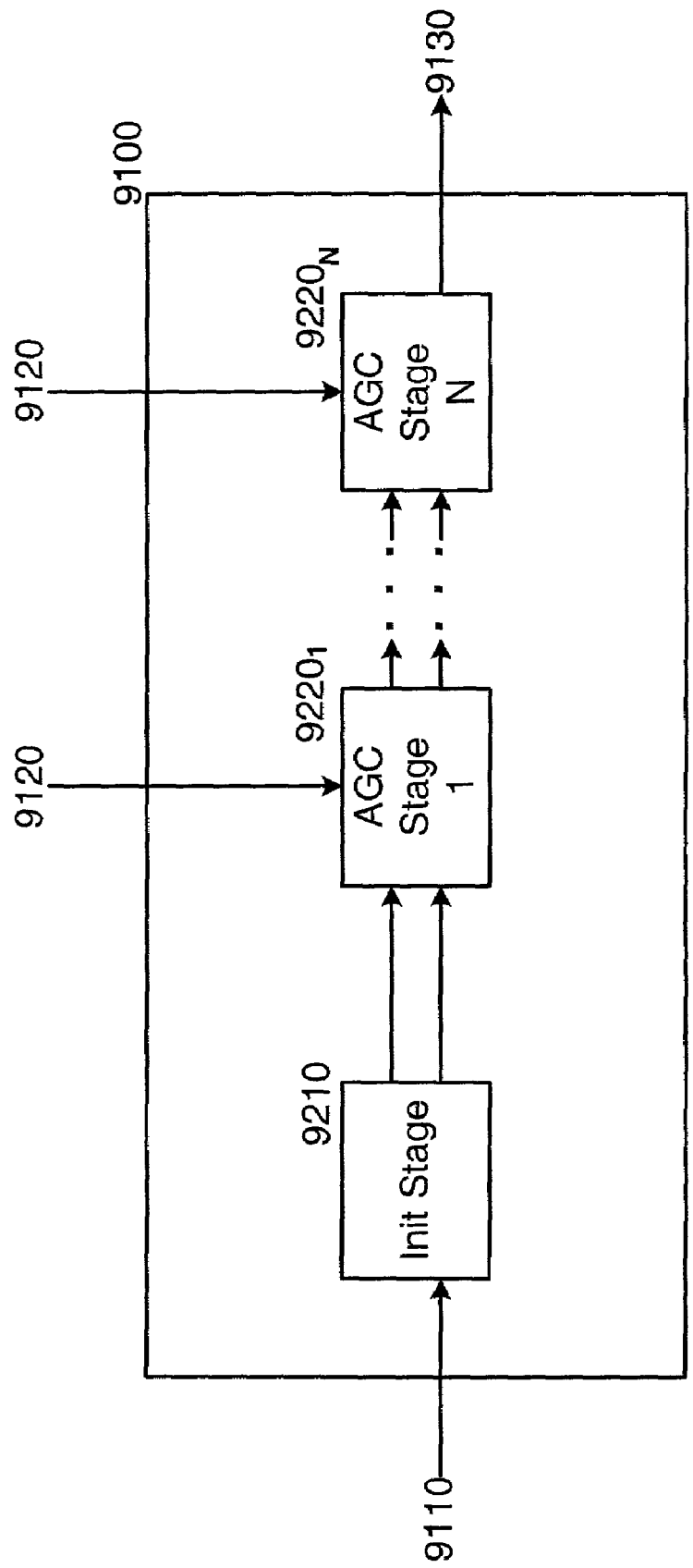
FIG. 18 is a block diagram showing the relevant logic blocks of an exemplary optical automatic gain controller in accordance with an embodiment of the present invention.

FIG. 18 is a block diagram showing the relevant logic blocks of the optical AGC 9100. Among other things, the optical AGC 9100 includes an initialization stage 9210 and a number of AGC stages $9220_1$-$9220_N$. The initialization stage 9210 processes the optical input signal 9110 in order to provide the necessary inputs to the first AGC stage $9220_1$, as described below. The outputs from each AGC stage are fed as inputs to the next AGC stage. Each AGC stage amplifies a received signal if and only if the optical input signal 9110 is below a predetermined threshold for that AGC stage, which is set using the bias signal 9120. The threshold decreases in each successive AGC stage, so that lower intensity input signals are amplified more than higher intensity input signals.

In one exemplary embodiment of the present invention, the threshold for the first AGC stage is set to roughly one half of a predetermined maximum signal intensity, and the thresholds are reduced by roughly one half in each successive AGC stage. In each AGC stage, the incoming signal is amplified by roughly 3 dB (i.e., doubled) if the incoming signal is below the threshold for the AGC stage. Thus, in an optical AGC having N AGC stages, an optical input signal below the first stage threshold is amplified once by 3 dB (i.e., doubled), an optical input signal below the second stage threshold is amplified twice by 3 dB (i.e., quadrupled), and so on, such that an optical input signal below the Nth stage threshold is amplified N times by 3 dB.

In this exemplary embodiment, each AGC stage 9220 receives as inputs a threshold input signal and a gain input signal and outputs a threshold output signal and a gain output signal. The threshold input signal is used to determine whether the optical input signal 9110 is above or below the threshold for the AGC stage. The threshold output signal is typically one half of the threshold input signal intensity. The gain output signal is equal to the gain input signal, if the optical input signal 9110 is above the threshold for the AGC stage, or to the gain input signal amplified by 3 dB, if the optical input signal 9110 is below the threshold for the AGC stage.

The initialization stage 9210 separates the optical input signal 9110 into a threshold input signal and a gain input signal for the first AGC stage $9220_1$. The threshold input signal is typically equal in intensity to the optical input signal 9110, and the gain input signal is typically one fourth the intensity of the optical input signal 9110.

Figure 19:
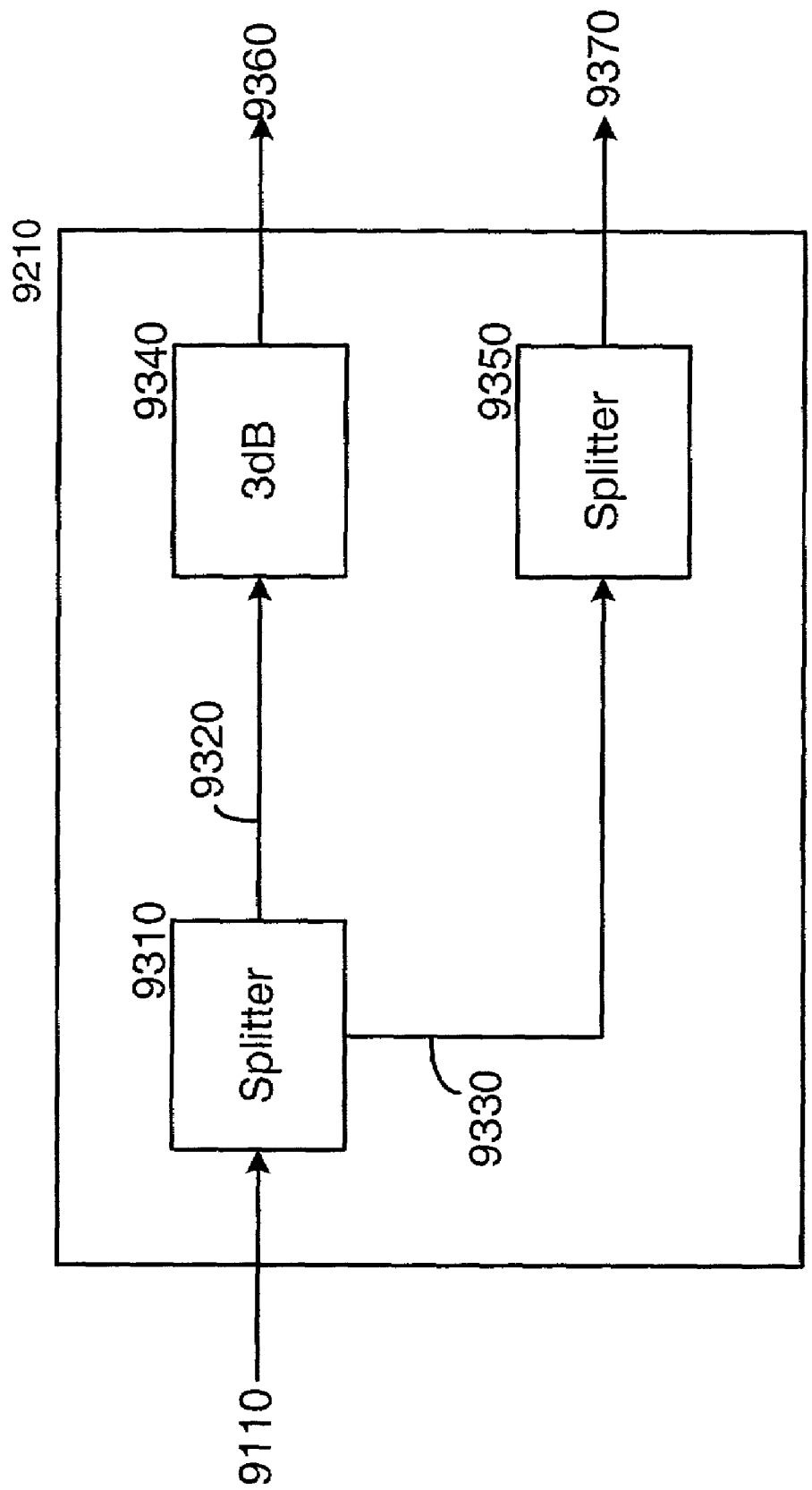
FIG. 19 is a schematic block diagram showing the relevant components of exemplary initialization stage logic in accordance with an embodiment of the present invention.

FIG. 19 is a schematic block diagram showing the relevant components of an exemplary initialization stage 9210. Among other things, the initialization stage 9210 includes optical splitters 9310 and 9350 and 3 dB amplifier 9340.

The optical input signal 9110 is fed into the optical splitter 9310. The optical splitter 9310 splits the optical input signal 9110 into two signals 9320 and 9330, each having half the intensity of the optical input signal 9110.

The signal 9320 is fed into the 3 dB amplifier 9330. The 3 dB amplifier 9330 amplifies the signal 9320 to produce output signal 9360 with an intensity substantially equal to the intensity of the optical input signal 9110.

The signal 9330 is fed into the optical splitter 9350. The optical splitter 9350 splits the signal 9330 to produce output signal 9370 with an intensity substantially equal to one fourth the intensity of the optical input signal 9110.

The output signals 9360 and 9370 are fed to the first AGC stage $9220_1$ as the threshold input signal and gain input signal, respectively.

Figure 20:
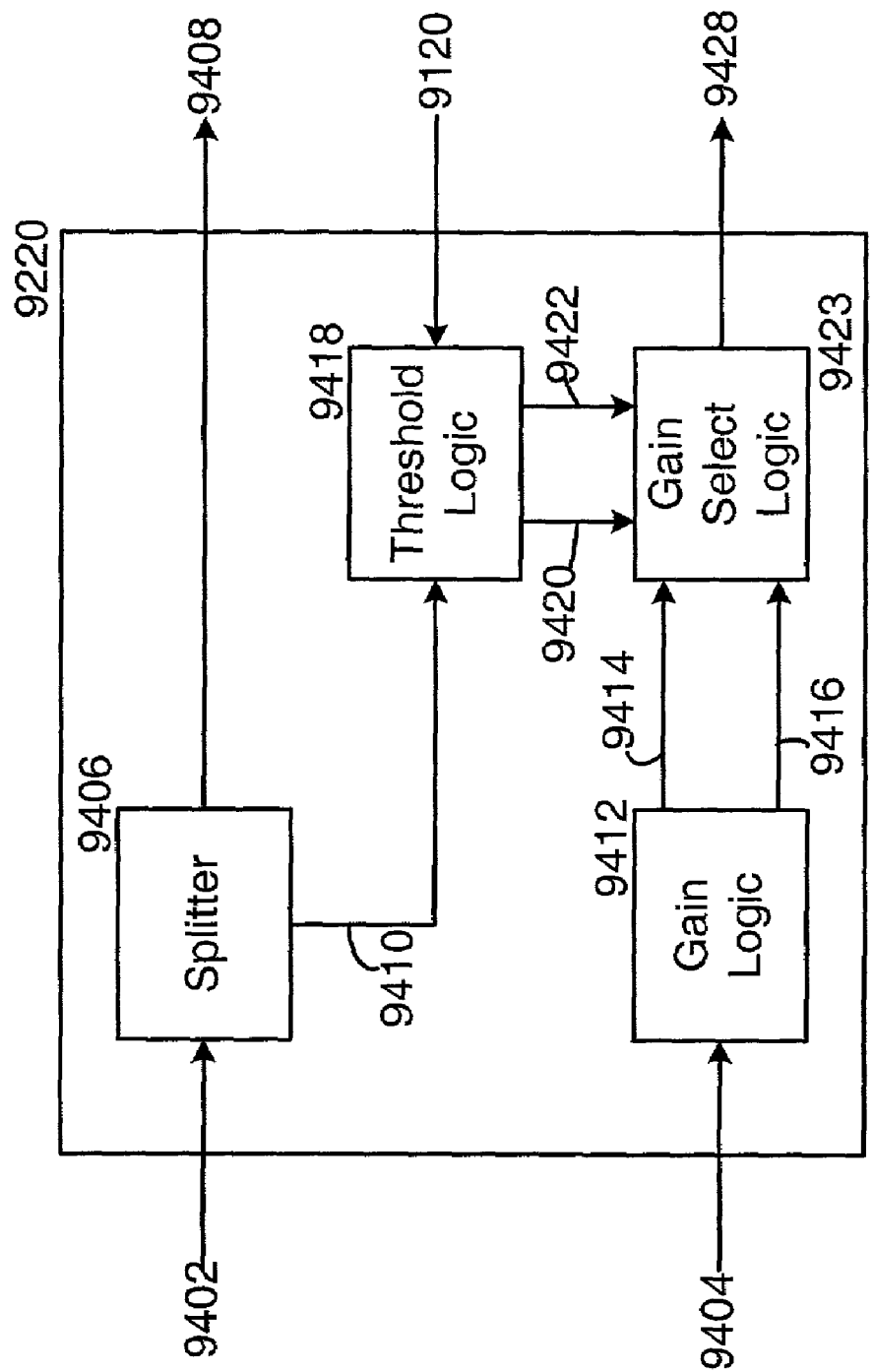
FIG. 20 is a schematic block diagram showing the relevant components of exemplary AGC stage logic in accordance with an embodiment of the present invention.

FIG. 20 is a schematic block diagram showing the relevant components of an exemplary AGC stage 9220. Among other things, the AGC stage 9220 includes optical splitter 9406, gain logic 9412, threshold logic 9418, and gain select logic 9423.

The threshold input signal 9402 is fed into the optical splitter 9406. The optical splitter 9406 splits the threshold input signal 9402 into two signals 9408 and 9410, each having half the intensity of the threshold input signal 9402.

The signal 9408 is output as the threshold output signal.

The signal 9410 is fed as an input into the threshold logic 9418, as is the bias signal 9120. The threshold logic 9418 outputs an above-threshold signal 9420 and a below-threshold signal 9422. If the signal 9410 is above the threshold for the AGC stage as set by the bias signal 9120, then the above-threshold signal 9420 is typically output at a "high" signal level and the below-threshold signal 9422 is typically output at a "low" signal level. If the signal 9410 is below the threshold for the AGC stage as set by the bias signal 9120, then the below-threshold signal 9422 is typically output at a "high" signal level and the above-threshold signal 9420 is typically output at a "low" signal level.

The gain input signal 9404 is fed as an input into the gain logic 9412. The gain logic 9412 outputs two signals 9414 and 9416. The signal 9414 is substantially equal in intensity to the gain input signal 9404. The signal 9416 is substantially equal in intensity to the gain input signal 9404 amplified by 3 dB.

The signals 9414, 9416, 9420, and 9422 are fed as inputs into the gain select logic 9423. The gain select logic 9423 outputs gain output signal 9428. If the above-threshold signal 9420 is input at a "high" signal level and the below-threshold signal 9422 is input at a "low" signal level, the gain select logic 9423 outputs the signal 9414 (equal to the gain input signal 9404) as the gain output signal 9428. If the below-threshold signal 9422 is input at a "high" signal level and the above-threshold signal 9420 is input at a "low" signal level, the gain select logic 9423 outputs the signal 9416 (equal to the gain input signal 9404 amplified by 3 dB) as the gain output signal 9428.

Figure 21:
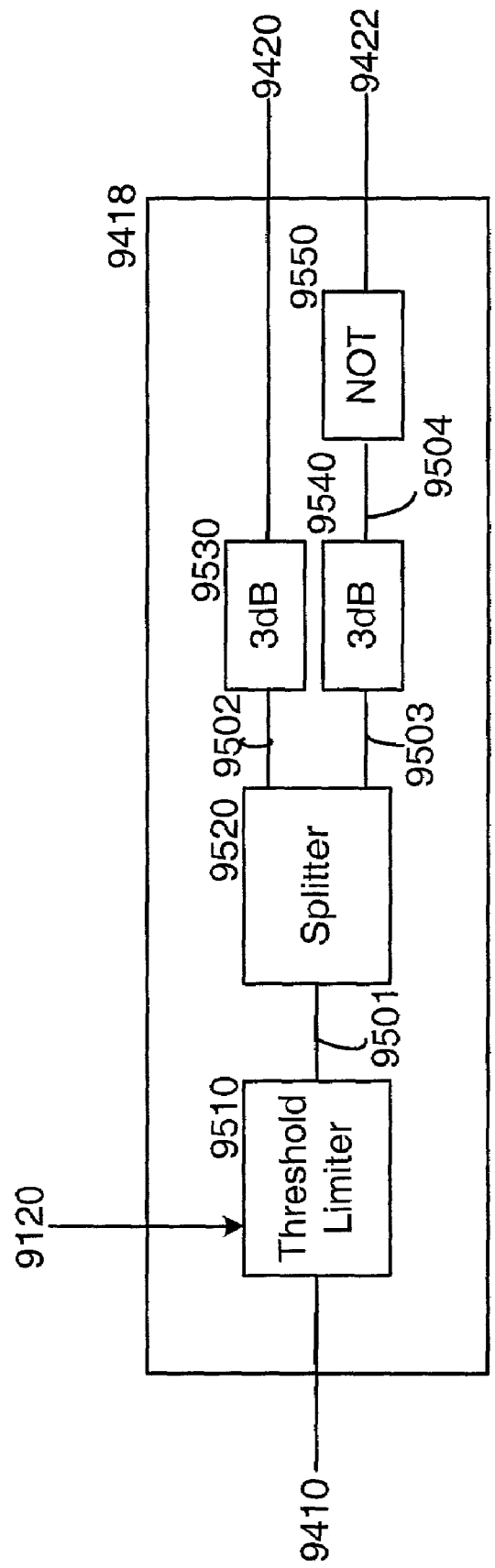
FIG. 21 is a schematic block diagram showing the relevant components of exemplary threshold logic in accordance with an embodiment of the present invention.

FIG. 21 is a schematic block diagram showing the relevant components of exemplary threshold logic 9418. Among other things, the threshold logic 9418 includes a threshold limiter 9510, an optical splitter 9520, two 3 dB amplifiers 9530 and 9540, and an optical NOT gate (inverter) 9550.

The threshold limiter 9510 is typically a number of optical hard limiters connected in series. As discussed above, the optical hard limiter has three regimes of operation, specifically a low regime in which the transmitted signal is low (zero), a middle regime in which the transmitted signal increases as the input signal increases, and a high regime in which the transmitted signal is high (one). Connecting multiple optical hard limiters in series tends to compress the middle regime such that the multiple optical hard limiters behave as if there is only a low regime below which the output is low (zero) and a high regime above which the output is high (one). This transition point is essentially the threshold of the threshold limiter 9510. The bias signal 9120 is fed as an input into the threshold limiter 9510, and more specifically to the various optical hard limiters in the threshold limiter 9510, and essentially sets the threshold point for the threshold limiter 9510.

The signal 9410 is fed as an input into the threshold limiter 9510. The threshold limiter 9510 outputs a low (zero) if the signal 9410 is below a predetermined threshold and outputs a high (one) if the signal 9410 is above the predetermined threshold.

The output signal 9501 from the threshold limiter 9510 is fed as an input into the optical splitter 9520. The optical splitter 9520 splits the signal 9510 into two signals 9502 and 9502, each having half the intensity of the signal 9501.

The signal 9502 is amplified by the 3 dB amplifier 9530 to produce the above-threshold signal 9420.

The signal 9503 is amplified by the 3 dB amplifier 9540 to produce signal 9504, which is fed into optical NOT gate 9550 to produce the below-threshold signal 9422.

If the signal 9410 is above the threshold of the threshold limiter 9510, then the above-threshold signal 9420 is output at a "high" signal level and the below-threshold signal 9422 is output at a "low signal level. If, however, the signal 9410 is below the threshold of the threshold limiter 9510, then the below-threshold signal 9422 is output at a "high" signal level and the above-threshold signal 9420 is output at a "low" signal level.

Figure 22:
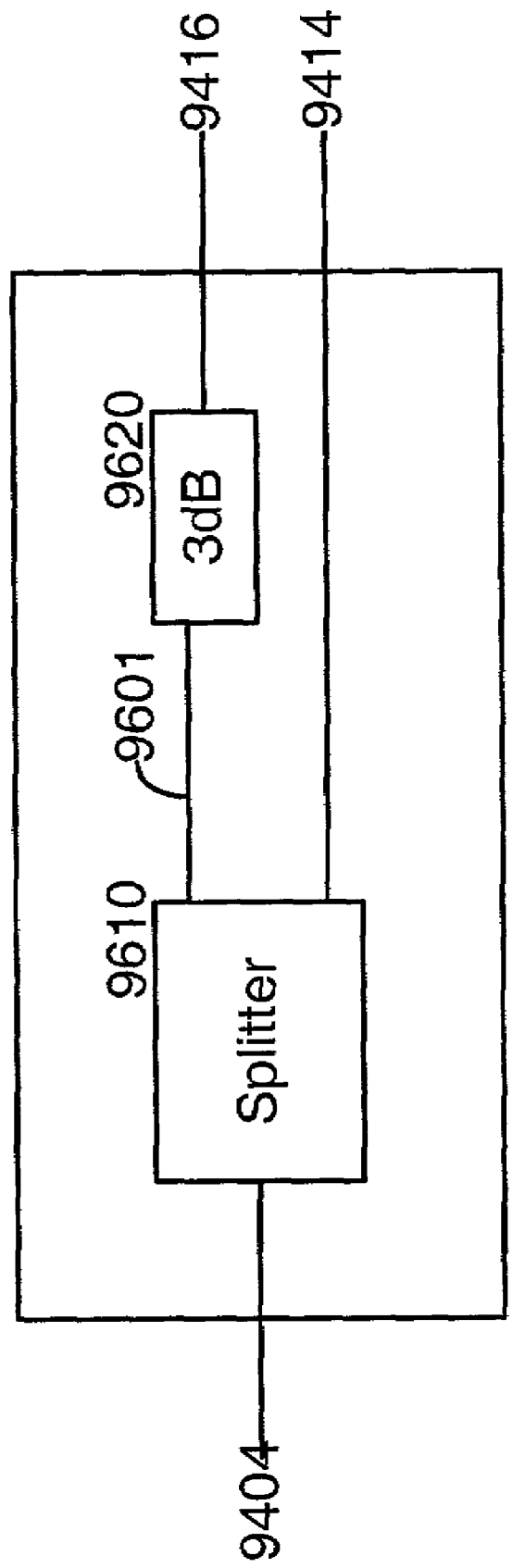
FIG. 22 is a schematic block diagram showing the relevant components of exemplary gain logic in accordance with an embodiment of the present invention.

FIG. 22 is a schematic block diagram showing the relevant components of exemplary gain logic 9412. Among other things, the gain logic 9412 includes an optical splitter 9610 and a 3 dB amplifier 9620.

The signal 9404 is fed as an input into the optical splitter 9610. The optical splitter 9610 splits the signal 9404 into two signals 9601 and 9414. The signal 9601 is fed as an input into the 3 dB amplifier 9620 to produce signal 9416.

Figure 23:
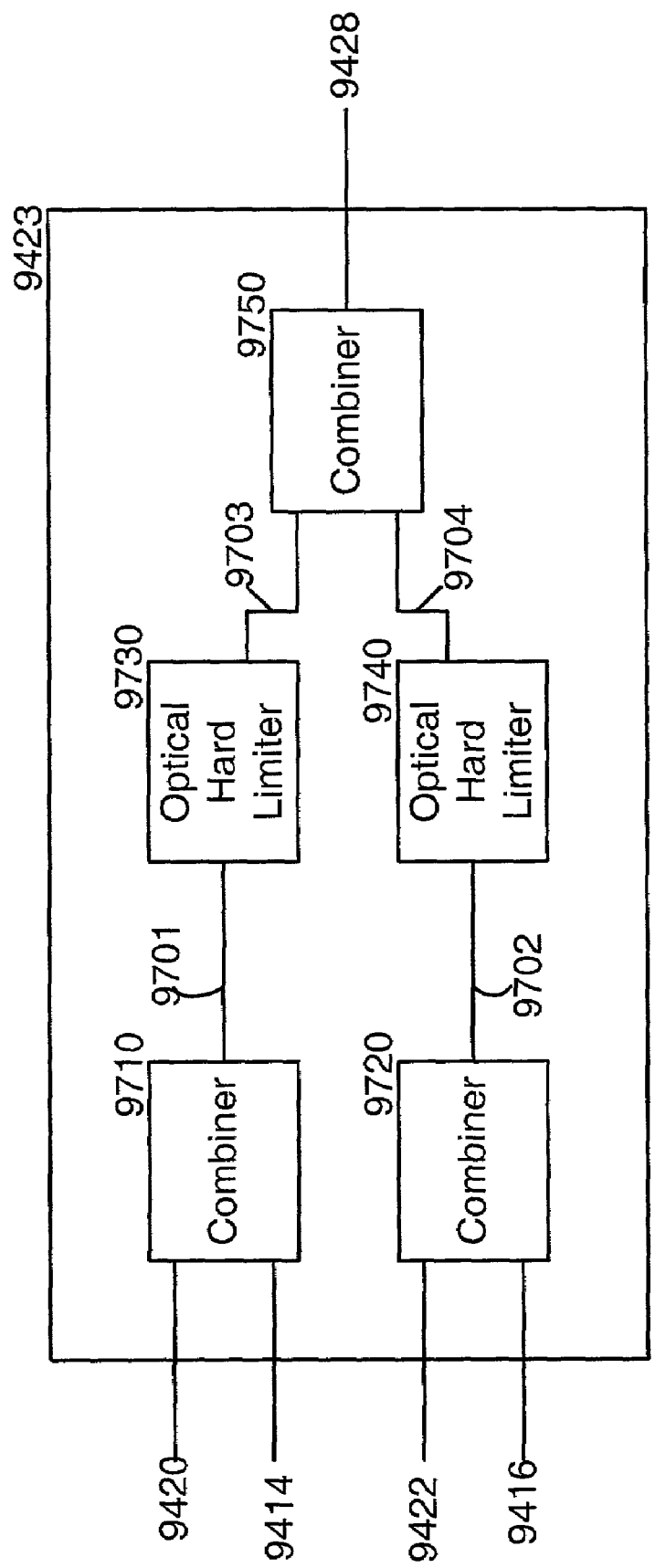
FIG. 23 is a schematic block diagram showing the relevant components of exemplary gain select logic in accordance with an embodiment of the present invention.

FIG. 23 is a schematic block diagram showing the relevant components of exemplary gain select logic 9423. Among other things, the gain select logic 9423 includes three optical combiners 9710, 9720, and 9750 as well as two optical hard limiters 9730 and 9740. Each optical combiner combines two optical inputs in equal proportions.

The above-threshold signal 9420 and the non-amplified signal 9414 are fed as inputs into the optical combiner 9710 to produce signal 9701. Signal 9701 is fed as an input into the optical hard limiter 9730. The transmitted signal 9703 from the optical hard limiter 9730 is fed as one input into the optical combiner 9750.

The below-threshold signal 9422 and the amplified signal 9416 are fed as inputs into the optical combiner 9720 to produce signal 9702. Signal 9702 is fed as an input into the optical hard limiter 9740. The transmitted signal 9704 from the optical hard limiter 9730 is fed as the other input into the optical combiner 9750.

If the signal is above the threshold for the AGC stage, then the above-threshold signal 9420 will be high and the below-threshold signal 9422 will be low. In this case, the signal 9701 will be within the middle regime of the optical hard limiter 9730 (i.e., above I1) such that the signal 9703 is an analog of the non-amplified signal 9414. The signal 9702, however, will be in the low regime of the optical hard limiter 9740 (i.e., below I1) such that the signal 9704 is low. Therefore, the non-amplified signal 9414 is passed by the combiner 9750 as the gain output signal 9428.

If the signal is below the threshold for the AGC stage, then the below-threshold signal 9422 will be high and the above-threshold signal 9420 will be low. In this case, the signal 9702 will be within the middle regime of the optical hard limiter 9740 (i.e., above I1) such that the signal 9704 is an analog of the amplified signal 9416. The signal 9701, however, will be in the low regime of the optical hard limiter 9730 (i.e., below I1) such that the signal 9703 is low. Therefore, the amplified signal 9416 is passed by the combiner 9750 as the gain output signal 9428.

In a multiple stage AGC 100 (i.e., N>1) as shown in FIG. 18, the threshold output signal 9408 and gain output signal 9428 from one AGC stage $9220_n$ are coupled respectively as the threshold input signal 9402 and gain input signal 9404 of the subsequent stage $9220_{n+1}$. The gain output signal 9428 of the last AGC stage $9220_N$ represents the optical output signal 9130 of the AGC 9100.

In the above exemplary embodiment, the optical input signal 9110 is split a number of times such that the intensity of the optical output signal 9130 is typically well below the intensity of the optical input signal 9110, even if the signal is amplified in various AGC stages. Therefore, it is common to amplify the optical output signal 9130 using a linear amplifier in order to compensate for the overall reduction in signal intensity caused by the AGC 9100.

Figure 24:
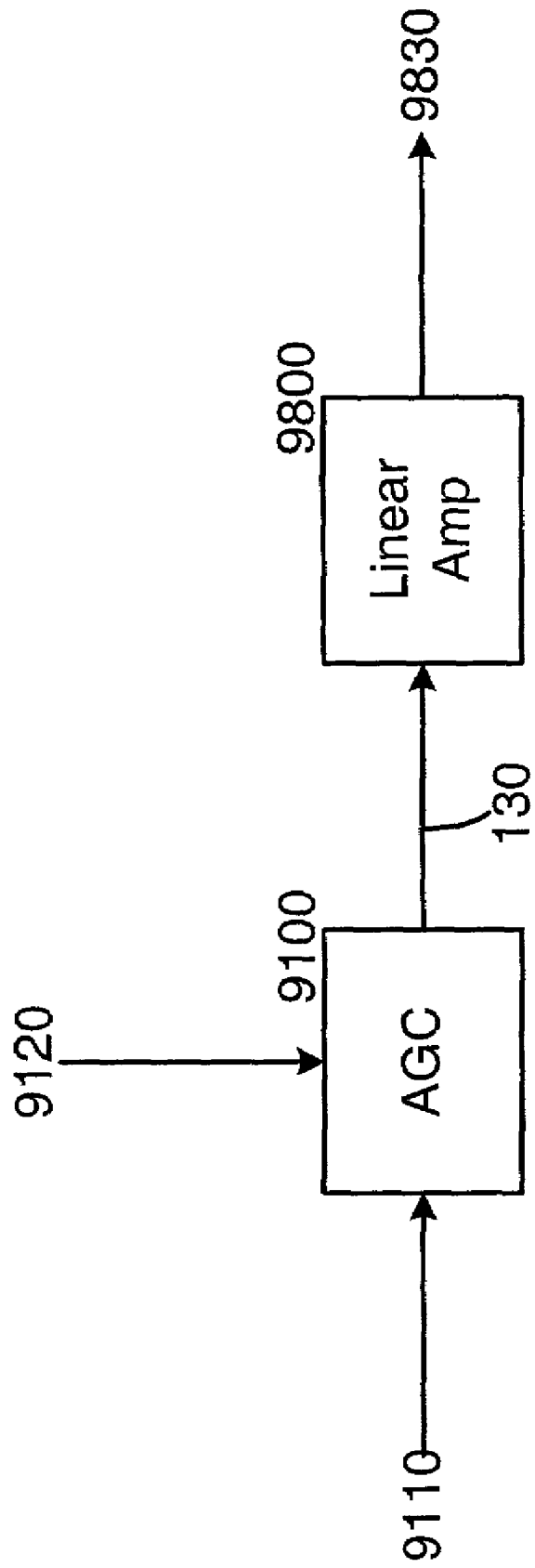
FIG. 24 is a block diagram showing an optical automatic gain control system including an optical automatic gain controller coupled in series to a linear amplifier in accordance with an embodiment of the present invention.

FIG. 24 is a block diagram showing an exemplary AGC system in which the optical output signal 9130 is amplified by a linear amplifier 9800 to produce an amplified signal 9830.

Figure 25:
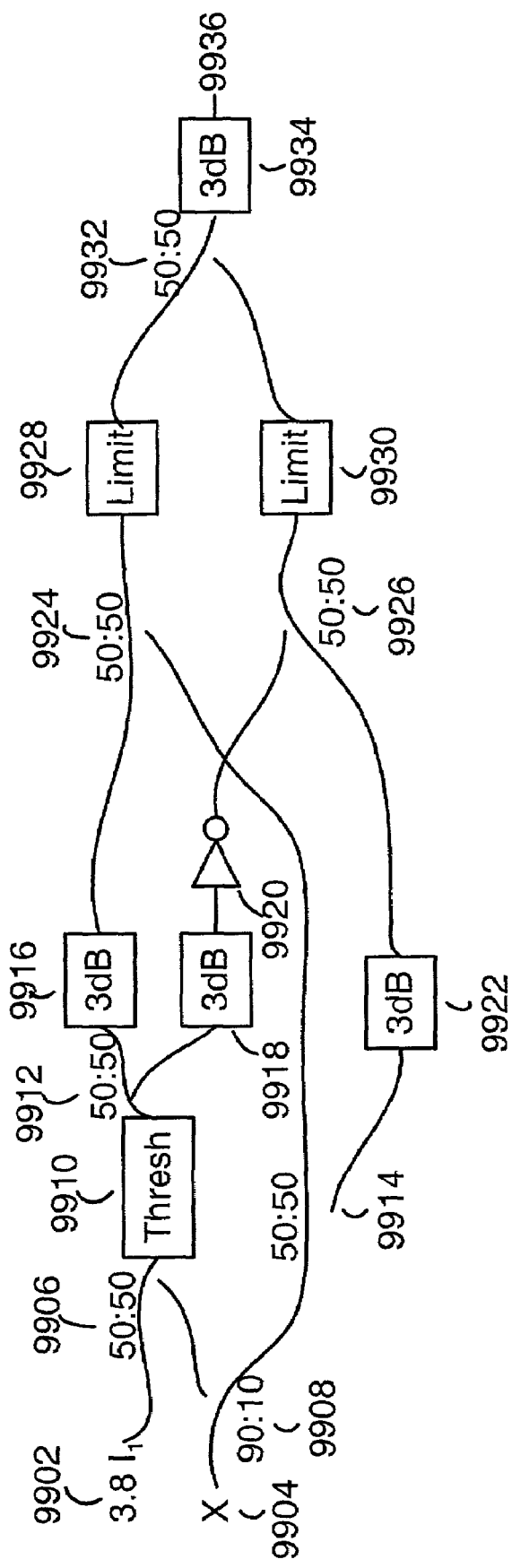
FIG. 25 is a schematic block diagram showing the relevant components of an exemplary single-stage optical automatic gain controller in accordance with an embodiment of the present invention.

FIG. 25 is a schematic block diagram showing an exemplary single-stage AGC 9900 for coarse AGC control. Among other things, the AGC 9900 includes various optical logic devices including optical splitters, optical combiners, optical hard limiters, and various components created from optical hard limiters, including a threshold limiter, various gain (amplifier) elements, and an optical NOT gate (inverter). For convenience, optical splitters and combiners are not shown explicitly, but instead are shown implicitly where two optical signal paths either join or diverge.

The optical input signal X 9904 is split with a 90:10 bias, with roughly 90 percent of the signal fed to the gain logic and 10 percent of the signal fed to the threshold logic. This 90:10 bias preserves most of the signal through the gain logic.

In the threshold logic, the 10 percent signal is combined 50:50 at point 9906 with a bias signal 9902 having an intensity of approximately 3.8 times I1. The resulting signal is fed into the threshold limiter 9910. The output of the threshold limiter 9910 is split 50:50 at point 9912. One signal is fed into an amplifier 9916 to produce the above-threshold signal. The other signal is fed into an amplifier 9918 and then into an inverter 9920 to produce the below-threshold signal.

In the gain logic, the 90 percent signal is split 50:50 at point 9914. One of the signals is amplified by amplifier 9922, while the other is left non-amplified.

The non-amplified signal from the gain logic is combined 50:50 at point 9924 with the above-threshold signal. The combined signal is fed into optical hard limiter 9928.

The amplified signal from the gain logic is combined 50:50 at point 9926 with the below-threshold signal. The combined signal is fed into optical hard limiter 9930.

The outputs from the optical hard limiters 9928 and 9930 are combined 50:50 at point 9932. The combined signal is amplified by amplifier 9934 to produce optical output signal 9936.

It should be noted that the present invention is in no way limited to the specific embodiments described above. The present invention is in no way limited to the logical separation of the AGC 9100 into an initialization stage and a number of AGC stages, to the logical separation of each AGC stage into threshold logic, gain logic, and gain select logic, or to any particular configuration of components whether in a stage, logic block, or otherwise. It will be apparent to a skilled artisan that various optical hard limiters and optical components built therefrom can be configured in different ways to construct alternative optical automatic gain controllers.

The threshold limiters are typically constructed of multiple optical hard limiters coupled in series. The number of optical hard limiters essentially determines the "slope" of the middle regime, with the slope increasing as the number of optical hard limiters increases. A typical threshold limiter includes at least four optical hard limiters. With a slope approaching the vertical, the middle regime of the threshold limiter approaches zero such that the threshold limiter outputs a low signal for input signals below approximately I1 and outputs a high signal for input signals above approximately I1. Thus, the threshold point of the threshold limiter is essentially fixed at I1. However, the threshold limiter is used along with the bias signal 9120 to effectively set the threshold for the threshold limiter. The bias signal is typically selected so that, when combined with the input signal, the threshold point for the input signal is roughly equal to I1. The bias signal may be different for different AGC stages.

Optical Switching Device

In today's information age, optical communication technologies are being used more and more frequently for transmitting information at very high speeds. Traditionally, information processing equipment (such as switches, routers, and computers) process information electronically. Therefore, optical communications are often converted into electronic form for processing by the information processing equipment. This electronic processing is slow relative to the speed of the optical communications themselves, and thus often becomes a "bottleneck" of optical communication and processing systems.

Optical information processing systems process information optically without the need to convert the information to an electronic form for processing electronically. One challenge in an optical information processing is the switching of optical information from an input to one of a number of outputs. Traditionally, optical information switching would be accomplished by converting the optical information into an electrical form, switching the information using traditional electronic means (e.g., routing based upon an address), and converting the switched information back into an optical form for further processing by the optical information processing system. This technique for switching optical information is limited by the speed of the electronics and becomes unsatisfactory as optical communication speeds increase.

Packet switching using all-optical logic has been explored using in-band addressing systems (U.S. Pat. No. 5,739,933) and out-of-band addressing systems (U.S. Pat. Nos. 5,488,501, 4,894,818).

In an embodiment of the present invention, an optical switching device switches optical information in the optical state. The optical switching device is based on stable, non-absorbing optical hard limiters and various optical logic devices and optical sampling/storage devices derived therefrom, as described above.

The optical switching device typically switches optical information from an input to one of a number of outputs based upon N address bits in the optical information. In order to switch a packet from an input to one of $M=2^N$ outputs, the optical switching device samples the N address bits using optical samplers as described above. The N sampled address bits are fed into an optical N-to-M address decoder, which activates one of the M optical outputs based upon the N optical inputs. Sufficient delay is introduced so that the packet can be output over the activated optical output.

In a typical embodiment of the present invention, the optical information is logically divided into individual messages, which, for convenience, are referred to hereinafter as packets. Each packet typically includes a starting flag, which marks the beginning of the packet, followed by N address bits and a number of data bits. The N address bits can be used to address up to M outputs.

FIG. 26 shows the format of an exemplary packet 8100. The packet 8100 includes starting flag 8110, address bits 8120, and data bits 8130. For convenience, the address bits 8120 are referred to hereinafter individually as address bits $8120_1$-$8120_N$.

In an embodiment of the present invention, the optical switching device switches a packet from an input to one of M outputs by removing the starting flag from the packet and making N+1 successive copies of the resulting packet with approximately one bit time delay between successive copies. Thus, for example, the first copy is delayed zero bit times, the second copy is delayed one bit time, and so on, such that the N+1th copy is delayed N bit times. In this way, all address bits and the starting flag location are aligned in time, respectively, across the N+1 copies after N bit times delay. The first N successive copies are fed individually into N successive optical samplers. Because of the successive delays in the first N successive copies, the N successive address bits arrive at the N success optical samplers after N bit times delay. The N optical samplers are clocked to simultaneously sample the N address bits at an appropriate time triggered off of the starting flag. The sampled address bits are fed into an optical N-to-M address decoder, which activates one of the M optical outputs based upon the N optical inputs. The N+1th copy is fed to all outputs, but is only output over the activated output. The starting flag is added back into the outgoing packet at the appropriate time so that a correctly formatted packet is output.

Figure 27:
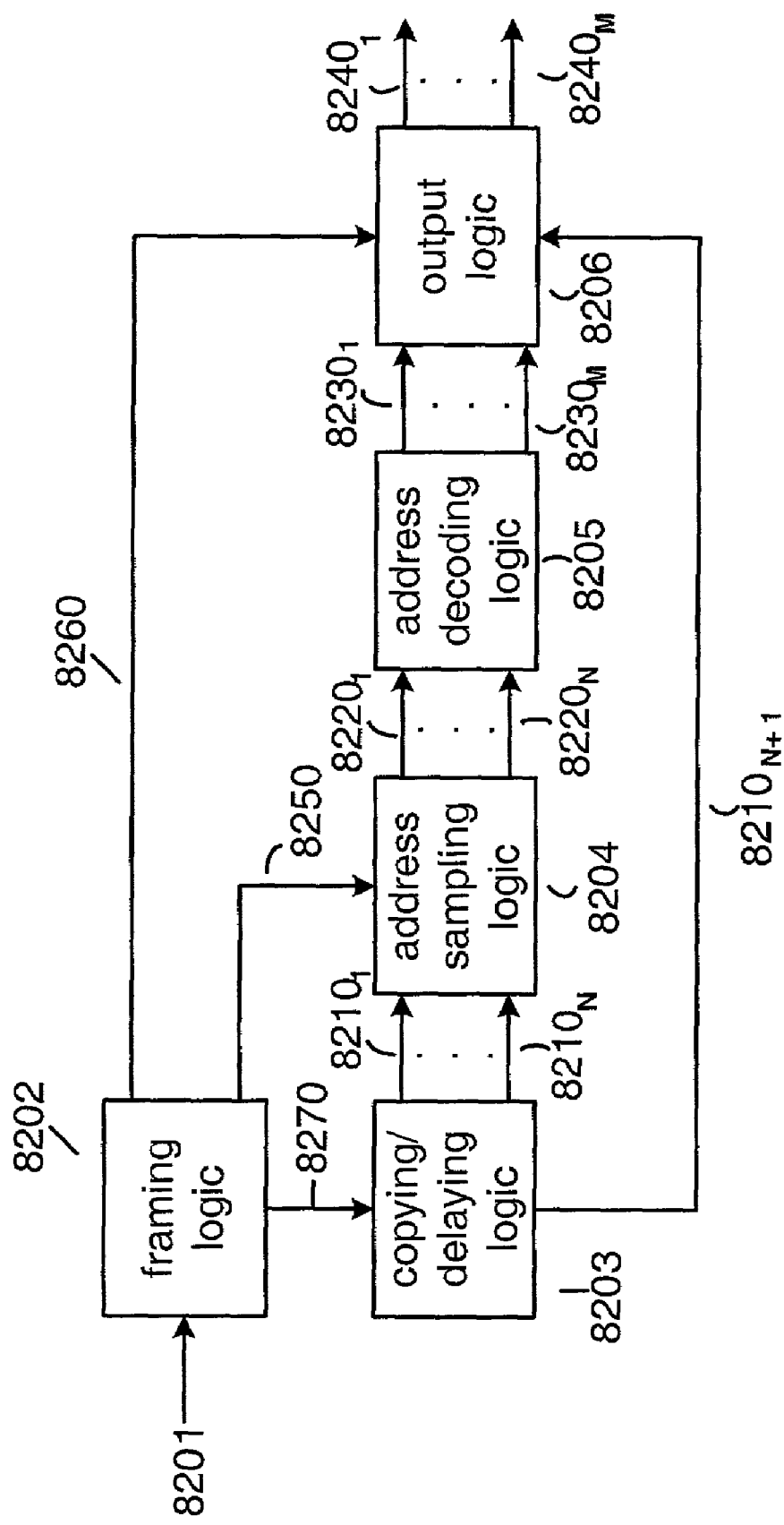
FIG. 27 is a schematic block diagram showing the relevant logic blocks of an optical switching device in accordance with an embodiment of the present invention.

FIG. 27 is a schematic block diagram showing the relevant logic blocks of an optical switching device 8200. Among other things, the optical switching device 8200 includes framing logic 8202, copying/delaying logic 8203, address sampling logic 8204, address decoding logic 8205, and output logic 8206.

The framing logic 8202 receives the optical input signal 8201 and monitors the optical input signal 8201 for the starting flag of a packet. When the framing logic 8202 detects the starting flag of a packet, the framing logic 8202 removes the starting flag from the packet. The framing logic 8202 passes the resulting packet to the copying/delaying logic 8203 as signal 8270. The framing logic 8202 sends a starting flag signal 8260 to the output logic 8206, and also sends a delayed clocking signal 8250 derived from the starting flag to the address sampling logic 8204.

Figure 28:
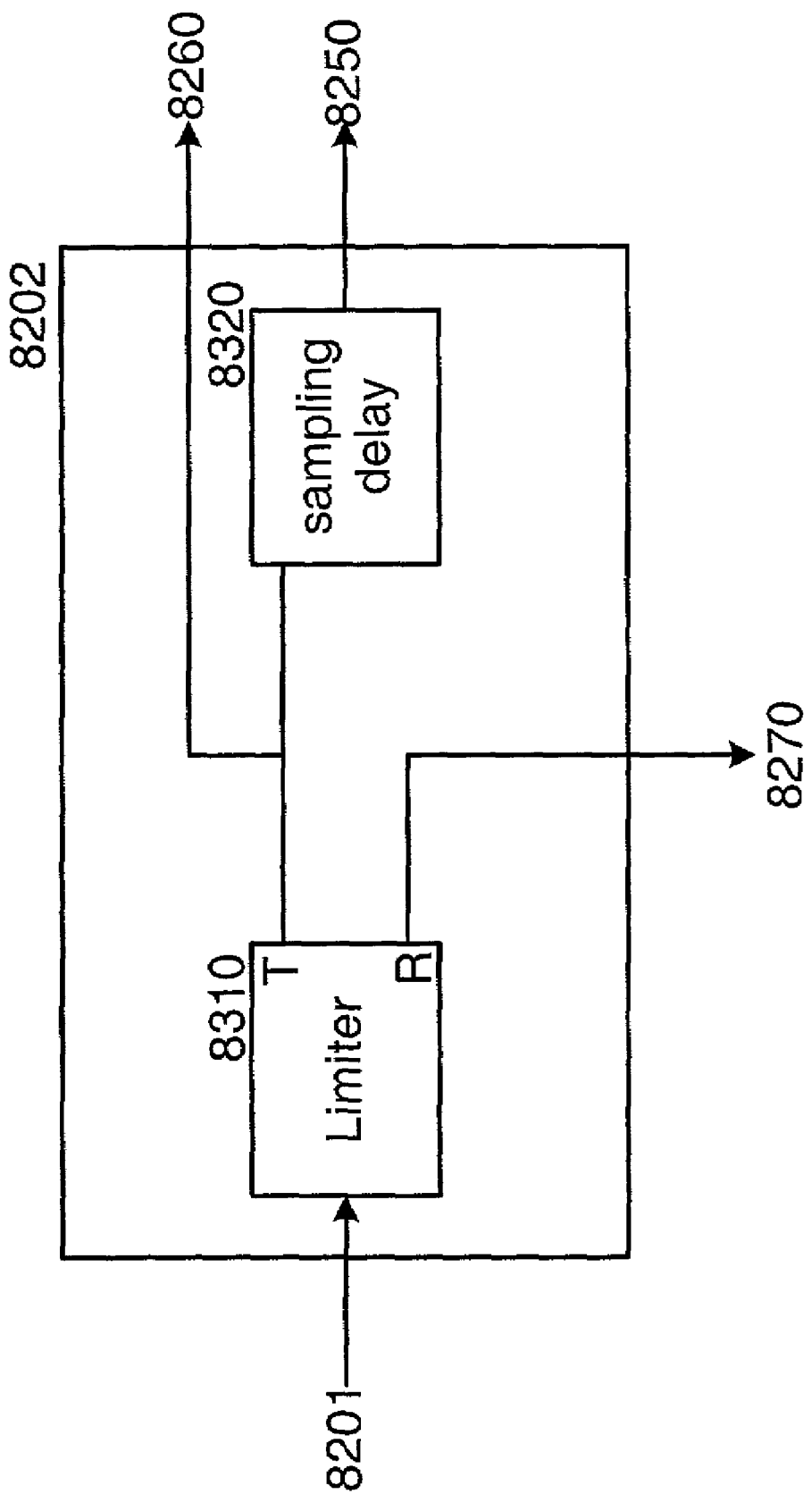
FIG. 28 is a schematic block diagram showing the relevant components of framing logic in accordance with an embodiment of the present invention.

FIG. 28 is a schematic block diagram showing the relevant components of the framing logic 8202. Among other things, the framing logic 8202 includes an optical hard limiter 8310 and a sampling delay element 8320. The optical hard limiter 8310 receives the optical input signal 8201. The optical hard limiter 8310 feeds the transmitted signal to the output logic 8206 as signal 8260 and to the sampling delay element 8320, and feeds the reflected signal to the copying/delaying logic 8203 as signal 8270. The sampling delay element 8320 generates the delayed clocking signal 8250 a predetermined amount of time after the starting flag. The delayed clocking signal 8250 controls the address sampling function of the address sampling logic, as described in more detail below.

The copying/delaying logic 8203 receives the signal 8270 from the framing logic 8202 and produces N+1 successive copies $8210_1$-$8210_{N+1}$ with approximately one bit time delay between successive copies. The copying/delaying logic 8203 feeds the first N copies $8210_1$-$8210_N$ to the address sampling logic 8204, and feeds the last copy $8210_{N+1}$ to the output logic 8206.

Figure 29:
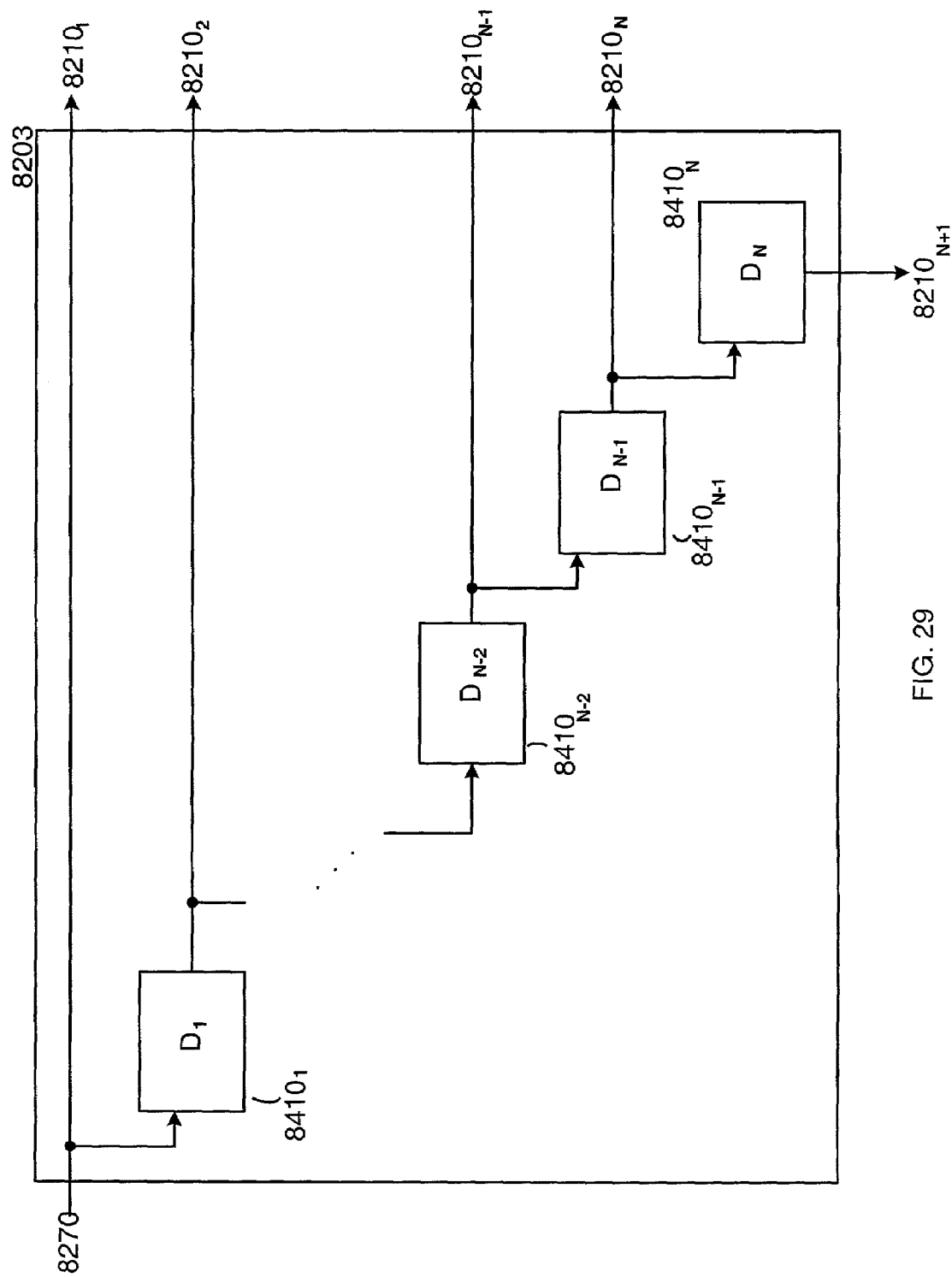
FIG. 29 is a schematic block diagram showing the relevant components of copying/delaying logic in accordance with an embodiment of the present invention.

FIG. 29 is a schematic block diagram showing the relevant components of the copying/delaying logic 8203. Among other things, the copying/delaying logic 8203 includes N delay elements $8410_1$-$8410_N$. Each delay element 8410 introduces one bit time delay to its input bit stream. The copying/delaying logic 8203 splits the signal 8270 into N+1 successive copies, with one bit time delay added to each successive copy. Specifically, the signal 8270 is split into two copies, a copy $8210_1$ with no delay and a duplicate copy that is fed into the delay element $8410_1$. The output of the delay element $8410_1$ is split into two copies, a copy $8210_2$ with one bit time delay and a duplicate copy that is fed into the next successive delay element (not shown). Subsequent copies are split in a similar fashion, until the Nth copy $8210_N$ with N−1 bit times delay is produced and a duplicate copy is fed into the delay element $8410_N$ to produce the N+1th copy $8210_{N+1}$ with N bit times delay.

Figure 30:
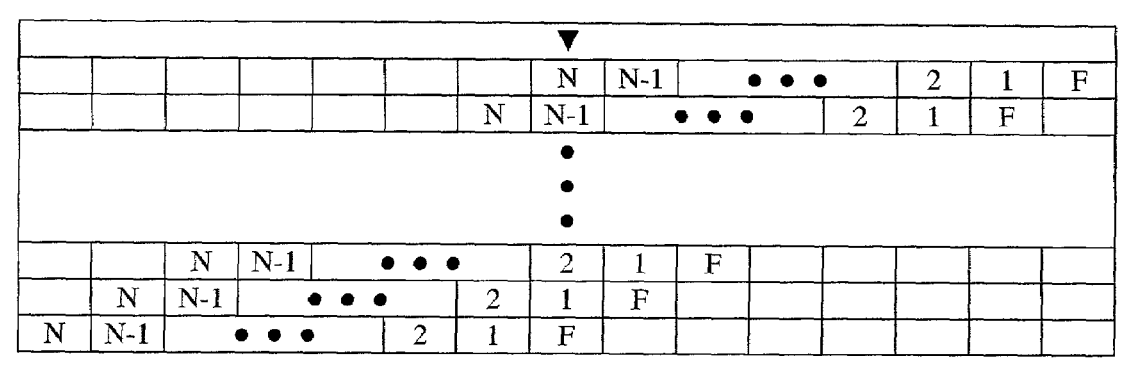

FIG. 30 shows the relationship between the N+1 successive copies $8210_1$-$8210_{N+1}$ produced by the copying/delaying logic 8203. As shown in FIG. 30, the N address bits and the starting flag location are aligned in time after N bit times delay, as shown by the arrow 8510.

The address sampling logic 8204 receives the first N successive copies $8210_1$-$8210_N$ from the copying/delaying logic 8203 as well as the delayed clocking signal 8250 and samples the N address bits when triggered by the delayed clocking signal 8250. The address sampling logic 8204 outputs the N sampled address bits $8220_1$-$8220_N$ to the address decoding logic 8205.

Figure 31:
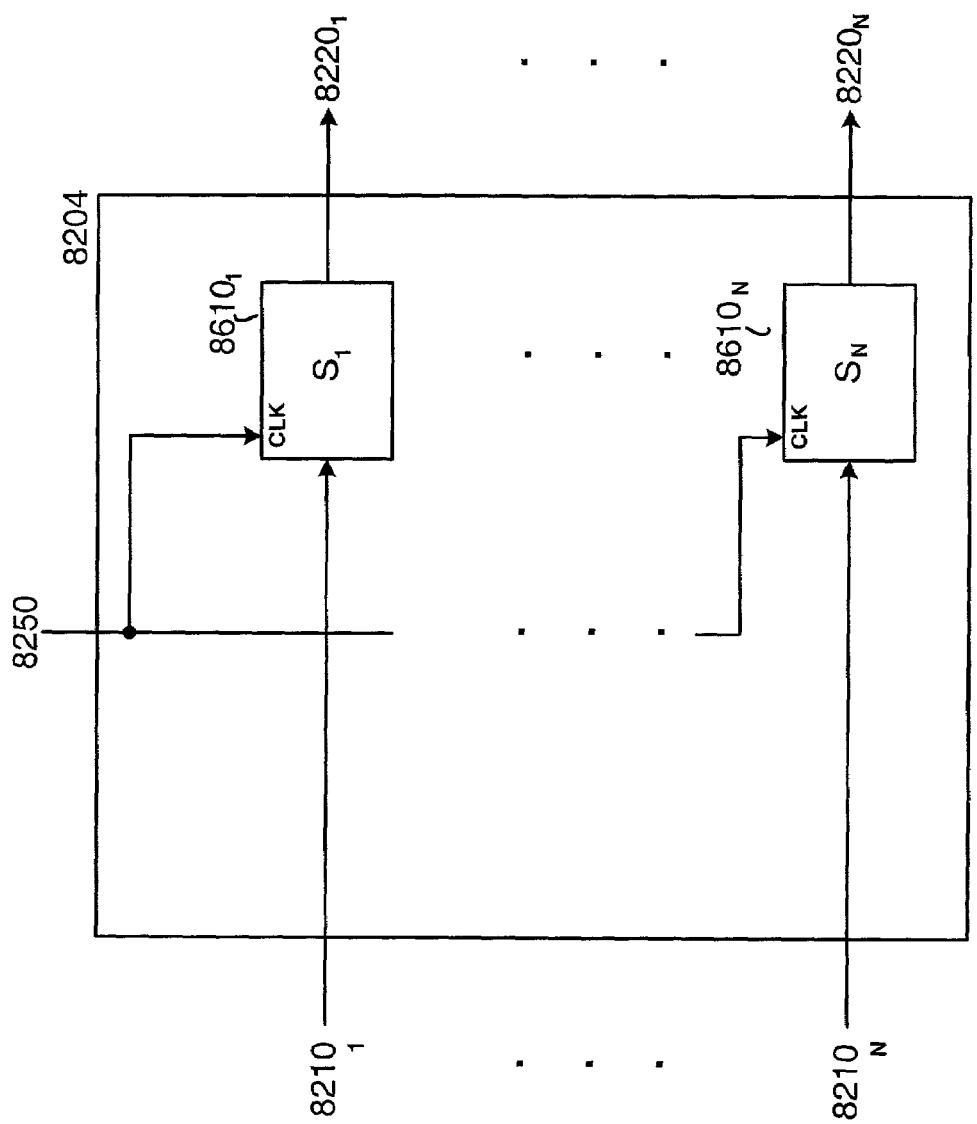
FIG. 31 is a schematic block diagram showing the relevant components of address sampling logic in accordance with an embodiment of the present invention.

FIG. 31 is a schematic block diagram showing the relevant components of the address sampling logic 8204. Among other things, the address sampling logic 8204 includes N optical samplers $8610_1$-$8610_N$. The copies $8210_1$-$8210_N$ are fed individually the inputs of the N optical samplers $8610_1$-$8610_N$, respectively. The delayed docking signal 8250 is fed to the clock input of the N optical samplers $8610_1$-$8610_N$. The N optical samplers $8610_1$-$8610_N$ sample the N address bits when triggered by the delayed clocking signal 8250 from the framing logic 8202. The optical sampler $8610_1$ samples address bit N, the optical sampler $8610_2$ samples address bit N−1, and so on. The N sampled address bits $8220_1$-$8220_N$ are fed to the address decoding logic 8205.

The address decoding logic 8205 receives the N sampled address bits $8220_1$-$8220_N$ from the address sampling logic 8204 and activates one of M output signals $8230_1$-$8230_M$ based upon the N sampled address bits $8220_1$-$8220_N$. An optical N-to-M decoder can be built from the various optical logic devices described in the related applications incorporated by reference above, and the details of a generic N-to-M decoder are omitted for convenience. However, an exemplary optical 2-to-4 decoder is shown and described below.

The output logic 8206 is coupled to the M output signals $8230_1$-$8230_M$, and also receives the starting flag signal 8260 and the last copy $8210_{N+1}$. The output logic 8206 inserts the starting flag into the last copy $8210_{N+1}$ and outputs the resulting packet over the one of M outputs $8240_1$-$8240_M$ activated by the address decoding logic 8205 using the M output signals $8230_1$-$8230_M$.

Figure 32:
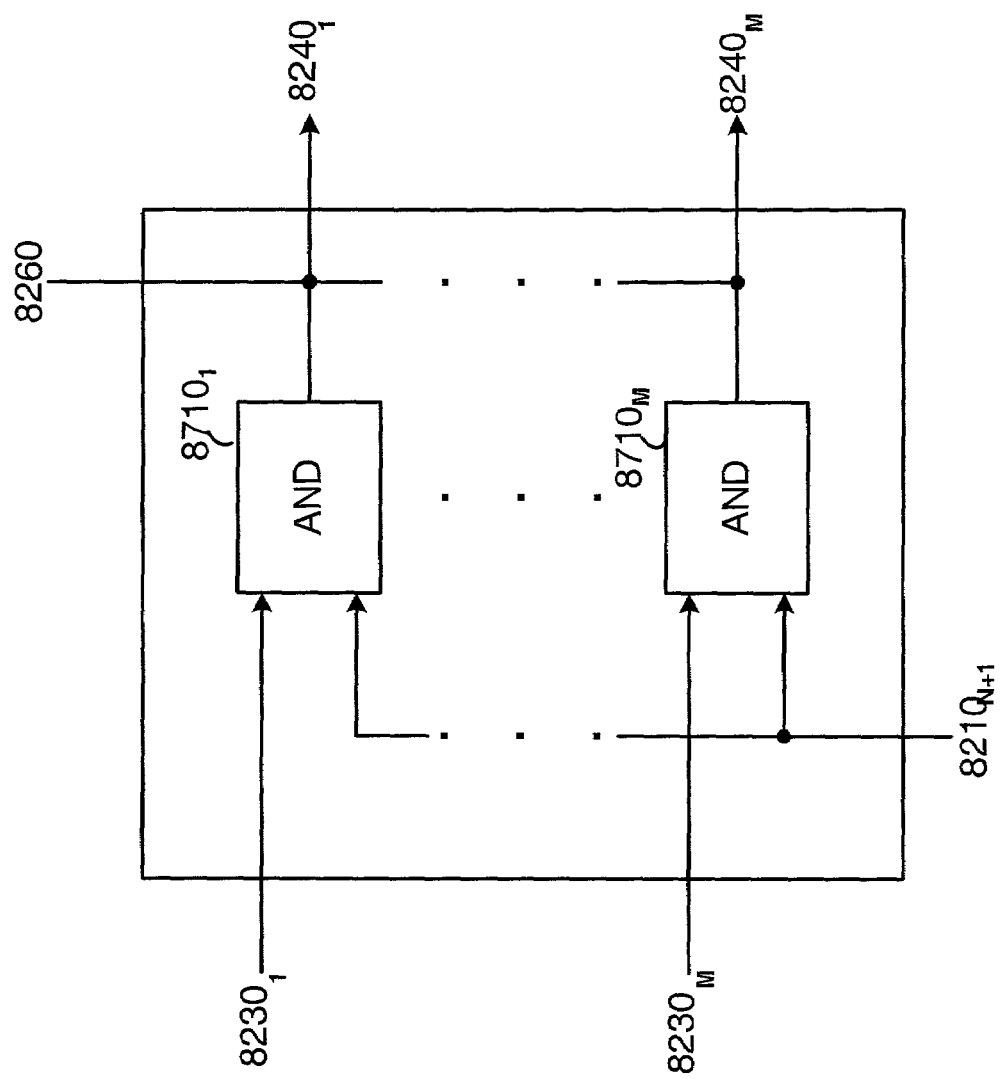
FIG. 32 is a schematic block diagram showing the relevant components of output logic in accordance with an embodiment of the present invention.

FIG. 32 is a schematic block diagram showing the relevant components of the output logic 8206. Among other things, the output logic 8206 includes M optical AND gates $8710_1$-$8710_M$. Each of the M output signals $8230_1$-$8230_M$ are coupled to one input of a respective optical AND gate $8710_1$-$8710_M$. The last copy $8210_{N+1}$ is coupled to the other input of all optical AND gates $8710_1$-$8710_M$. The starting flag signal 8260 is coupled to all M outputs $8240_1$-$8240_M$ on the output side of the M optical AND gates $8710_1$-$8710_M$.

It should be noted that each time an optical signal is split, the signal intensity is reduced on each branch by approximately one half. Therefore, optical gain elements are used at appropriate points in the optical switching device 8200 to amplify optical signals. The gain elements are omitted from the figures for convenience.

Various aspects of the present invention can be demonstrated by example with reference to an optical switching device that switches packets from an input to four outputs based upon two address bits in each packet (i.e., N=2 and M=4).

Figure 33:
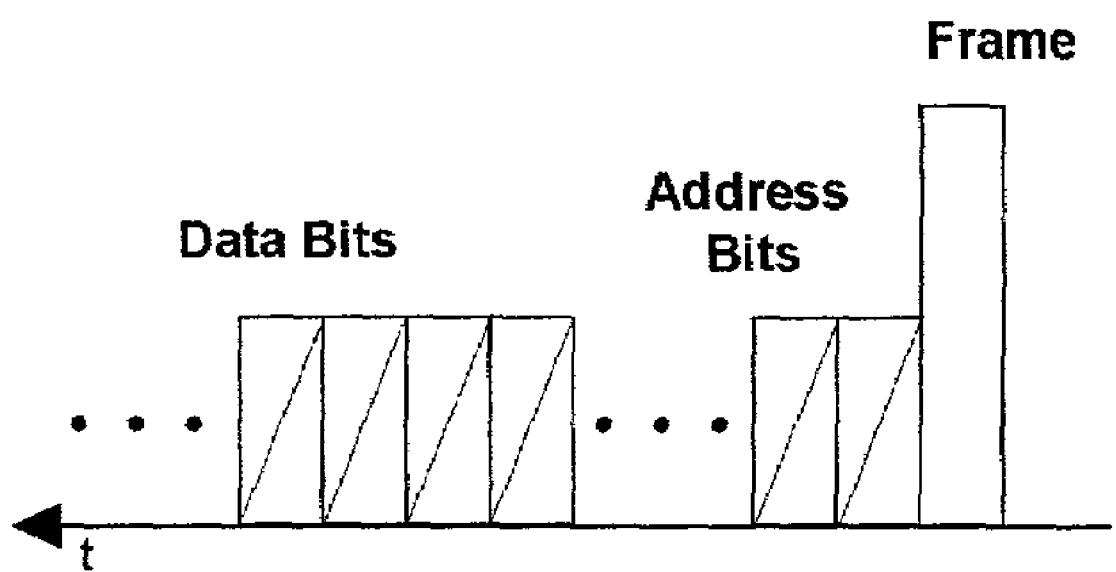
FIG. 33 shows the format of an exemplary packet in accordance with an embodiment of the present invention.

FIG. 33 shows an exemplary packet 8800 that includes a starting (framing) bit, two address bits, and a number of data bits.

Figure 34:
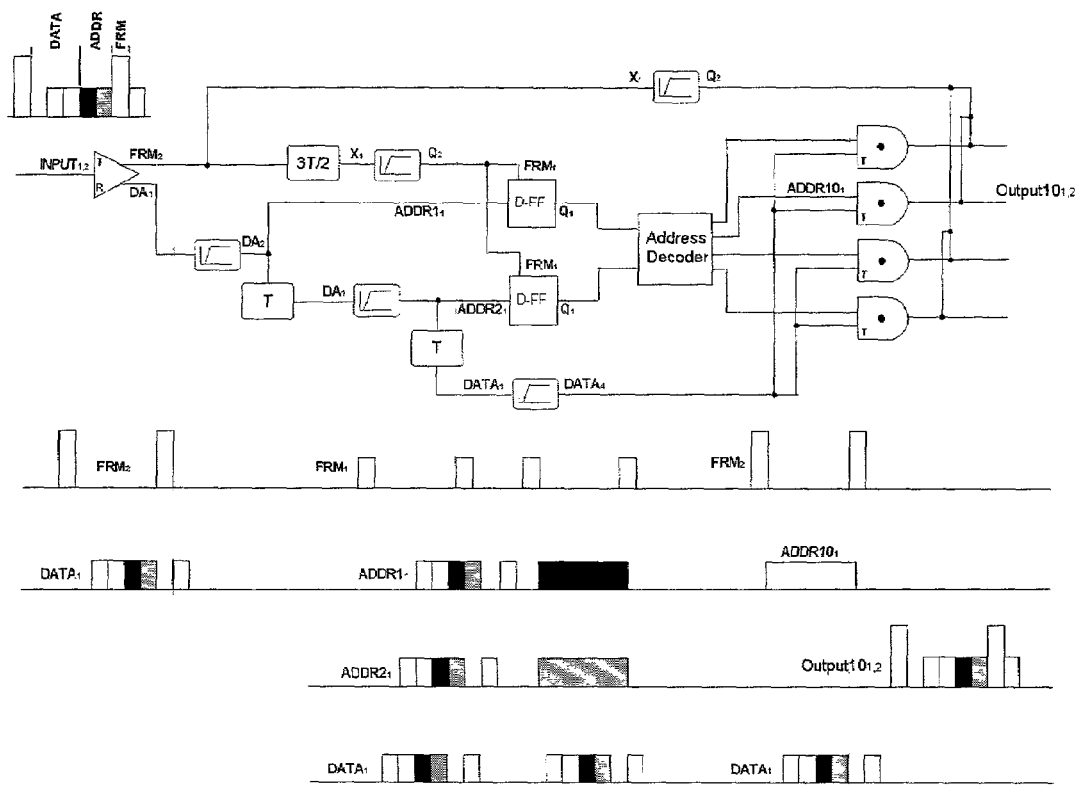
FIG. 34 is a schematic block diagram showing an exemplary optical switching device for switching optical information from an input to one of four outputs based upon two address bits in each packet in accordance with an embodiment of the present invention.

FIG. 34 is a schematic block diagram showing an exemplary optical switching device 8900 for switching packets from an input to one of four outputs based upon two address bits in each packet. For convenience, reference numbers for elements shown in FIG. 34 are consistent with the reference numbers used in FIGS. 27-32. Also for convenience, timelines for the three packet copies are shown.

The optical switching device 8900 switches packets from an input 8201 to one of four outputs $8240_1$-$8240_4$ based upon two address bits in each packet. The optical hard limiter 8310 receives the optical input signal 8201 and separates the framing bit from the packet. The transmitted signal from the optical hard limiter 8310 (i.e., the framing bit) is coupled to the outputs $8240_1$-$8240_4$ as signal 8260 and to the sampling delay element 8320. The sampling delay element 8320 generates the delayed clocking signal 8250 after a delay of approximately 3T/2 (where T is one bit time). The reflected signal 8270 from the optical hard limiter 8310 is split into two copies, a copy $8210_1$ with no delay that is fed into the optical sampler $8610_1$ and a duplicate copy that is fed into the delay element $8410_1$. The output of the delay element $8410_1$ is split into two copies, a copy $8210_2$ with one bit time delay that is fed into the optical sampler $8610_2$ and a duplicate copy that is fed into delay element $8410_2$. The output of the delay element $8410_2$ produces a copy $8210_3$ with two bit times delay that is fed to the optical AND gates $8710_1$-$8710_4$. The optical samplers $8610_1$ and $8610_2$ sample the copies $8210_1$ and $8210_2$, respectively, when clocked by the delayed clocking signal 8250. The sampled address bits $8220_1$ and $8220_2$ are fed into the address decoder 8205, which activates one of the four output signals $8230_1$-$8230_4$ based upon the two sampled address bits $8220_1$ and $8220_2$. This in turn activates one of the four optical AND gates $8710_1$-$8710_4$, and the copy $8210_3$ is output over the activated output $8240_1$-$8240_4$. The framing signal 8260 adds the framing bit back into the packet at the appropriate time so that the entire packet is output.

Figure 35:
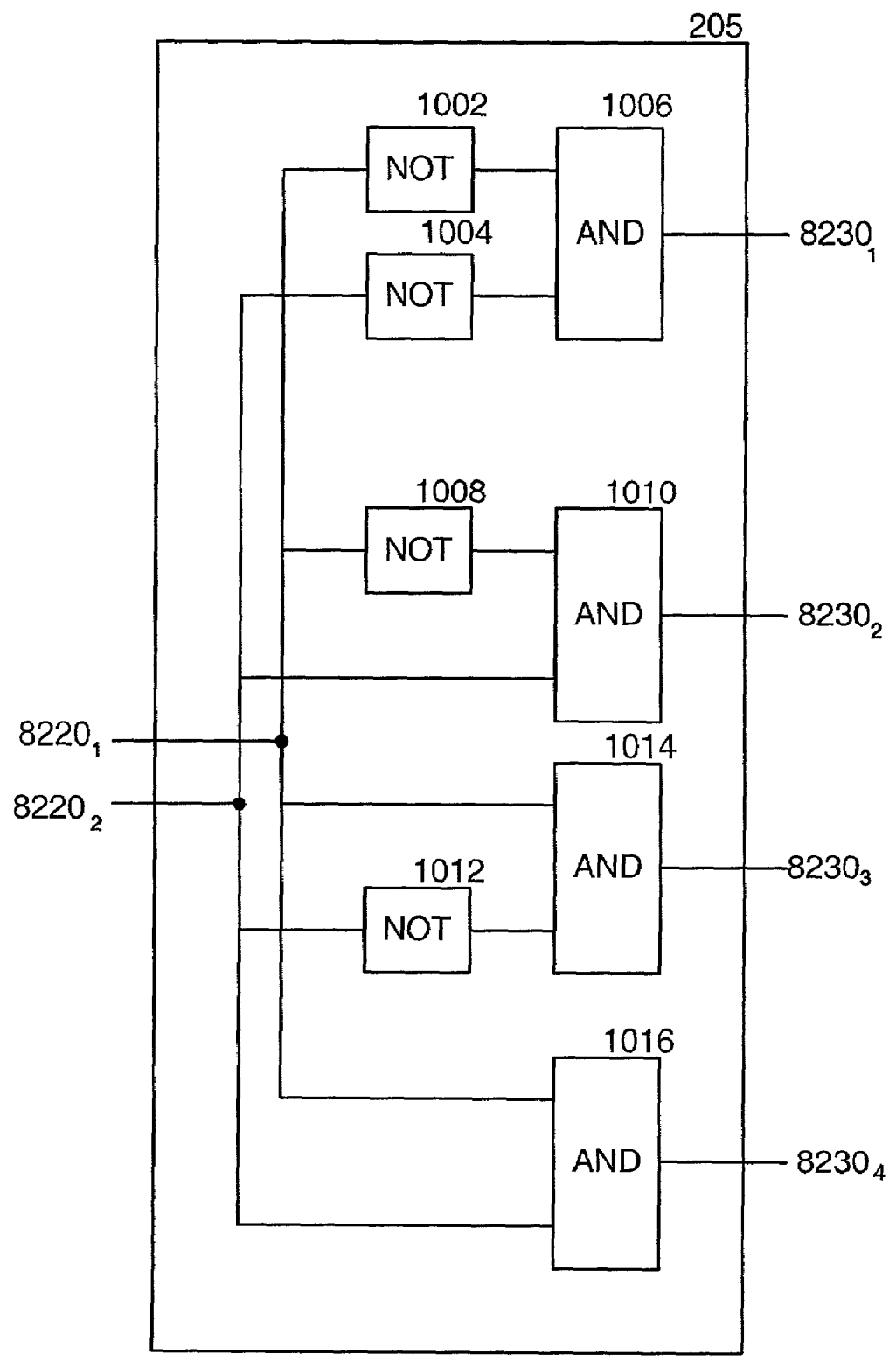
FIG. 35 is a schematic block diagram showing the relevant components of an exemplary 2-to-4 address decoder in accordance with an embodiment of the present invention.

It will be apparent to a skilled artisan that the optical N-to-M address decoder 8205 can be constructed using various optical logic gates and devices described in the related applications incorporated by reference above, and the present invention is not limited to any particular optical N-to-M address decoder. FIG. 35 is a schematic block diagram showing an exemplary optical 2-to-4 address decoder 8205 for use in the optical switching device shown in FIG. 34. Among other things, the optical 2-to-4 address decoder 8205 includes optical NOT gates 1002, 1004, 1008, 1012 and optical AND gates 1006, 1010, 1014, 1016. The sampled address bit $8220_1$ is coupled to optical AND gates 1006 and 1010 through optical NOT gates 1002 and 1008, respectively, and to optical AND gates 1014 and 1016. The sampled address bit $8220_2$ is coupled to optical AND gates 1006 and 1014 through optical NOT gates 1008 and 1012, respectively, and to optical AND gates 1010 and 1016. If sampled address bits $8220_1$ and $8220_2$ are zero and zero, respectively, then the output signal $8230_1$ is activated. If sampled address bits $8220_1$ and $8220_2$ are zero and one, respectively, then the output signal $8230_2$ is activated. If sampled address bits $8220_1$ and $8220_2$ are one and zero, respectively, then the output signal $8230_3$ is activated. If sampled address bits $8220_1$ and $8220_2$ are one and one, respectively, then the output signal $8230_4$ is activated.

Figure 36:
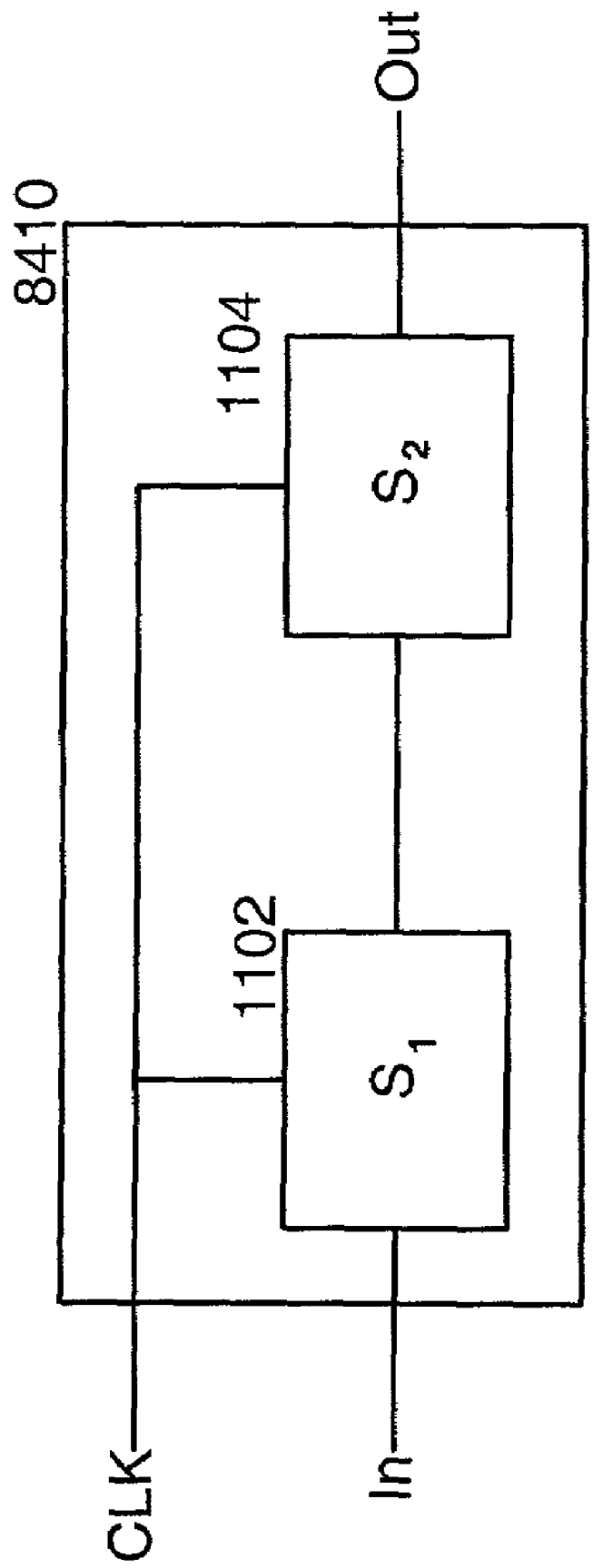
FIG. 36 is a schematic block diagram showing the relevant components of an exemplary optical delay element in accordance with an embodiment of the present invention.

It will also be apparent to a skilled artisan that the various optical delay elements can be constructed using various optical logic gates and devices described in the related applications incorporated by reference above, and the present invention is not limited to any particular optical delay elements. FIG. 36 is a schematic block diagram showing an optical delay element 8410 for introducing one bit time delay. Among other things, the optical delay element 8410 includes two optical samplers 1102 and 1104 coupled in series. The optical samplers 1102 and 1104 are clocked at the optical bit rate. The output of the optical delay element 8410 is delayed one bit time from the input.

In the exemplary embodiment described above, the address bits are sampled by splitting the packet into N+1 successive copies with approximately one bit time delay between successive copies. However, the present invention is in no way limited to this technique for sampling the address bits or to any particular way of sampling the address bits.

For one example, the address bits can be sampled using an optical shift register of sorts. The optical shift register includes N optical samplers coupled in series. The packet is shifted through the optical shift register until all N address bits are sampled, at which time the address decoding logic is clocked to decode the sampled address bits.

Figure 37:
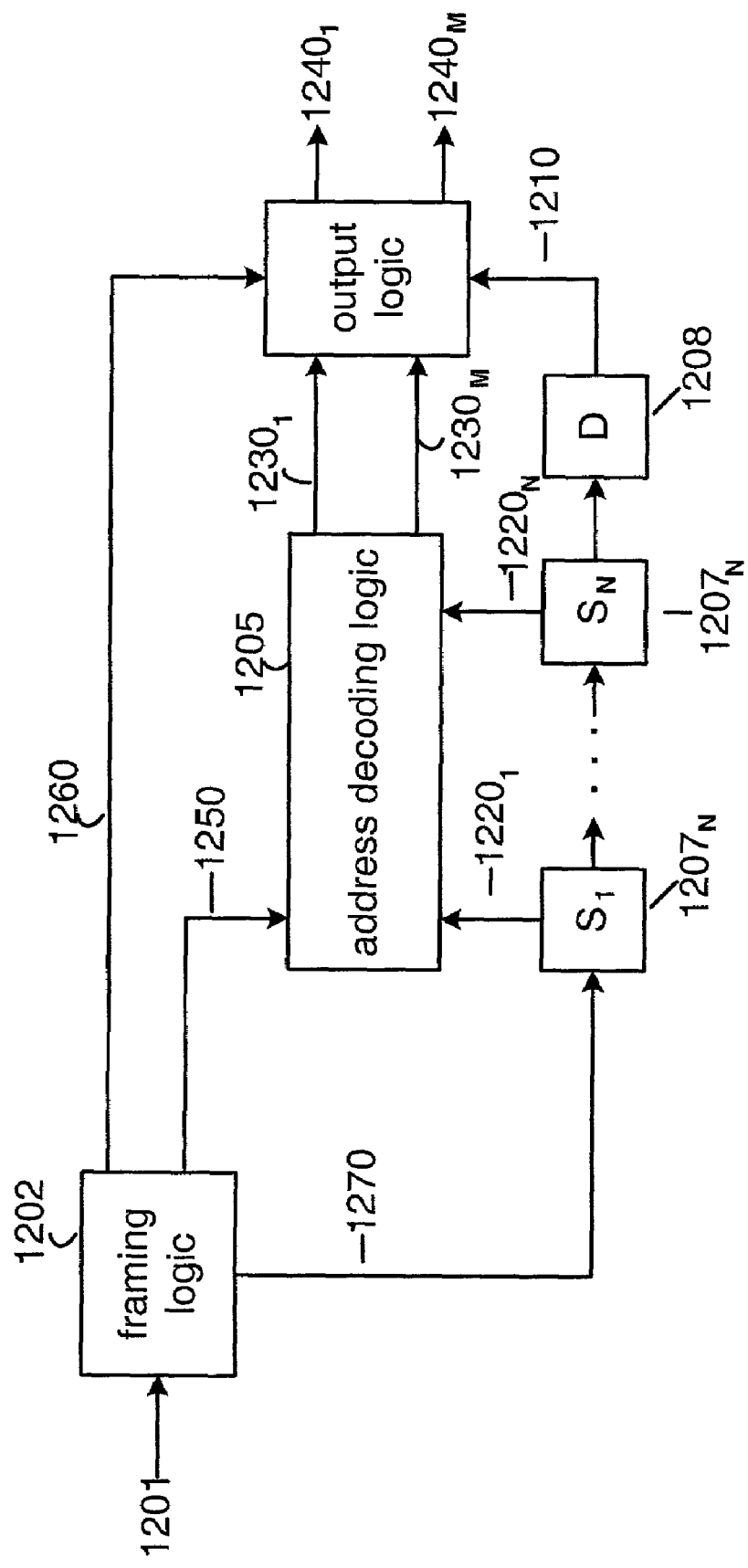
FIG. 37 is a schematic block diagram showing an exemplary optical switching device that uses an optical shift register to sample address bits in accordance with an embodiment of the present invention.

FIG. 37 is a schematic block diagram showing an exemplary optical switching device 3700 that uses an optical shift register of sorts for sampling the N address bits. The optical shift register includes N optical samplers $1207_1$-$1207_N$ and an optical delay element 1208 coupled in series. The N optical samplers $1207_1$-$1207_N$ and the optical delay element 1208 are clocked at the optical bit rate.

The framing logic 1202 receives the optical input signal 1201 and monitors the optical input signal 1201 for the starting flag of a packet. When the framing logic 1202 detects the starting flag of a packet, the framing logic 1202 removes the starting flag from the packet. The framing logic 1202 passes the resulting packet to the optical shift register 1207 as signal 1270. The framing logic 1202 sends a starting flag signal 1260 to the output logic 1206, and also sends a delayed clocking signal 1250 derived from the starting flag to the address decoding logic 1205.

The signal 1270 is propagated through the optical shift register 1207 and the optical delay element 1210. When all N address bits have been sampled by the N optical samplers $1207_1$-$1207_N$, the delayed clocking signal 1250 prompts the address decoding logic 1205 to decode the sampled address bits $1220_1$-$1220_N$ and activate one of the output signals $1230_1$-$1230_M$ to the output logic 1206. The delayed packet copy 1210 is also fed into the output logic 1206, with the optical delay element 1208 adding an appropriate amount of delay such that the delayed packet copy 1210 arrives at the output logic 1206 at the appropriate time. The output logic 1206 outputs the delayed packet copy 1210 over one of the outputs $1240_1$-$1240_M$ activated by the output signals $1230_1$-$1230_M$.

It should be noted that certain details of the embodiment shown and described with reference to FIG. 37 have been omitted for convenience.

It should be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

Optical Analog-to-Digital Converter

Analog to digital conversion is used for a variety of communication applications. Traditionally, information processing equipment (such as switches, routers, and computers)

process information electronically. Therefore, optical signals are often converted into electronic signals for analog-to-digital conversion. This electronic processing is slow relative to the speed of the optical communications themselves, and thus often becomes a "bottleneck" of optical communication and processing systems.

An all-optical analog-to-digital converter (ADC) can be built from optical limiter of the type described above. An exemplary N-bit ADC uses the successive approximation model to generate N optical output signals based upon an optical input signal. Specifically, the N-bit ADC has N processing levels, which, for convenience, are numbered 1 through N, respectively. A processing level x (with x=1 to N) includes (x−1) optical limiters. Thus, processing level 1 includes zero optical limiters, processing level 2 includes one optical limiter, processing level 3 includes two optical limiters, and so on.

Within a particular processing level x, each of the (x−1) optical limiters is biased such that:

$$a=I=2^{x-1}.$$

Thus, the optical limiter in processing level 2 is biased with a=I=2, the optical limiters in processing level 3 are biased with a=I=4, and so on.

Within a particular processing level x, the (x−1) optical limiters (if there is more than one optical limiter in the processing level x) are connected in series, with the transmitted signal from one optical limiter coupled as the input to the subsequent optical limiter, and the transmitted signal of the final optical limiter in the series represents the optical output signal for the processing level x. The reflected signals from the (x−1) optical limiters (if there is at least one optical limiter in the processing level x) are coupled together as the input to the processing level (x−1).

Figure 44:
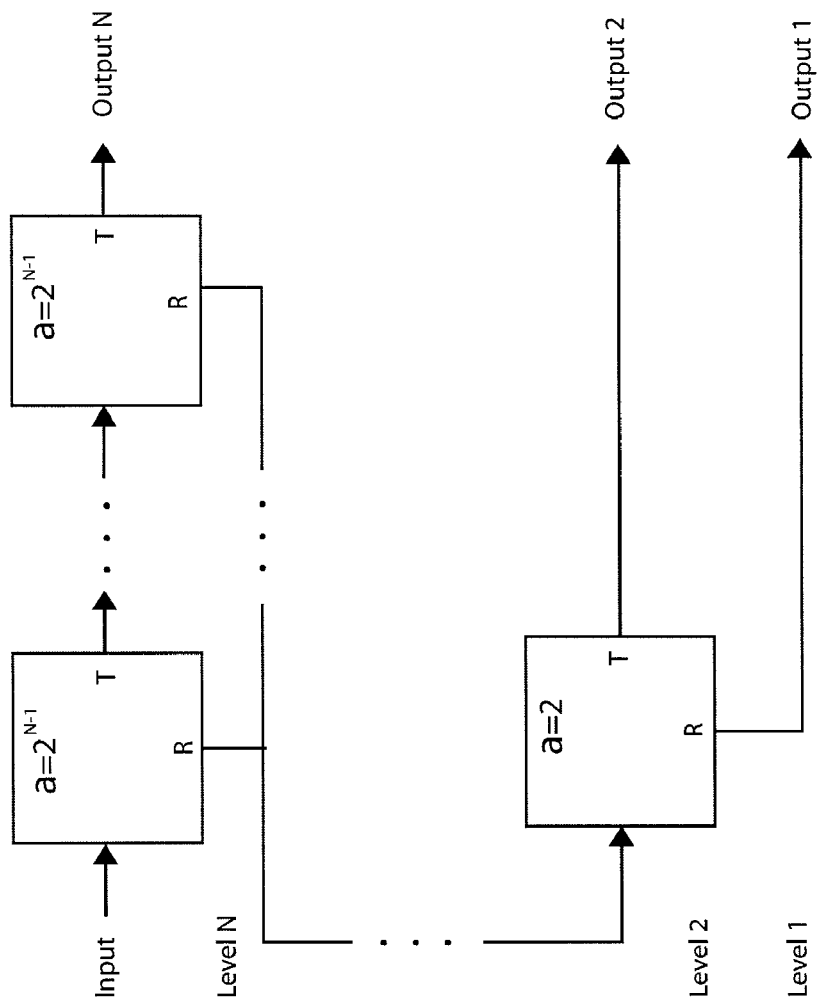
FIG. 44 shows an all-optical N-bit analog-to-digital converter based on stable, non-absorbing optical hard limiters in accordance with an embodiment of the present invention.

FIG. 44 shows an exemplary N-bit ADC 4400 in accordance with an embodiment of the present invention. The ADC 4400 has N processing levels, which, for convenience, are numbered 1 through N. A processing level x (with x =1 to N) includes (x−1) optical limiters. Thus, processing level 1 includes zero optical limiters, processing level 2 includes one optical limiter, and so on, with processing level N having (N−1) optical limiters.

Within a particular processing level x, each of the (x−1) optical limiters is biased such that:

$$a=I=2^{x-1}.$$

Thus, the optical limiter in processing level 2 is biased with a=I=2, and so on, with the optical limiters in processing level N biased with a=I=$2^{N-1}$.

Within a particular processing level x, the (x−1) optical limiters (if there is more than one optical limiter in the processing level x) are connected in series, with the transmitted signal from one optical limiter coupled as the input to the subsequent optical limiter, and the transmitted signal of the final optical limiter in the series represents the optical output signal for the processing level x. The reflected signals from the (x−1) optical limiters (if there is at least one optical limiter in the processing level x) are coupled together as the input to the processing level (x−1).

Figure 45:
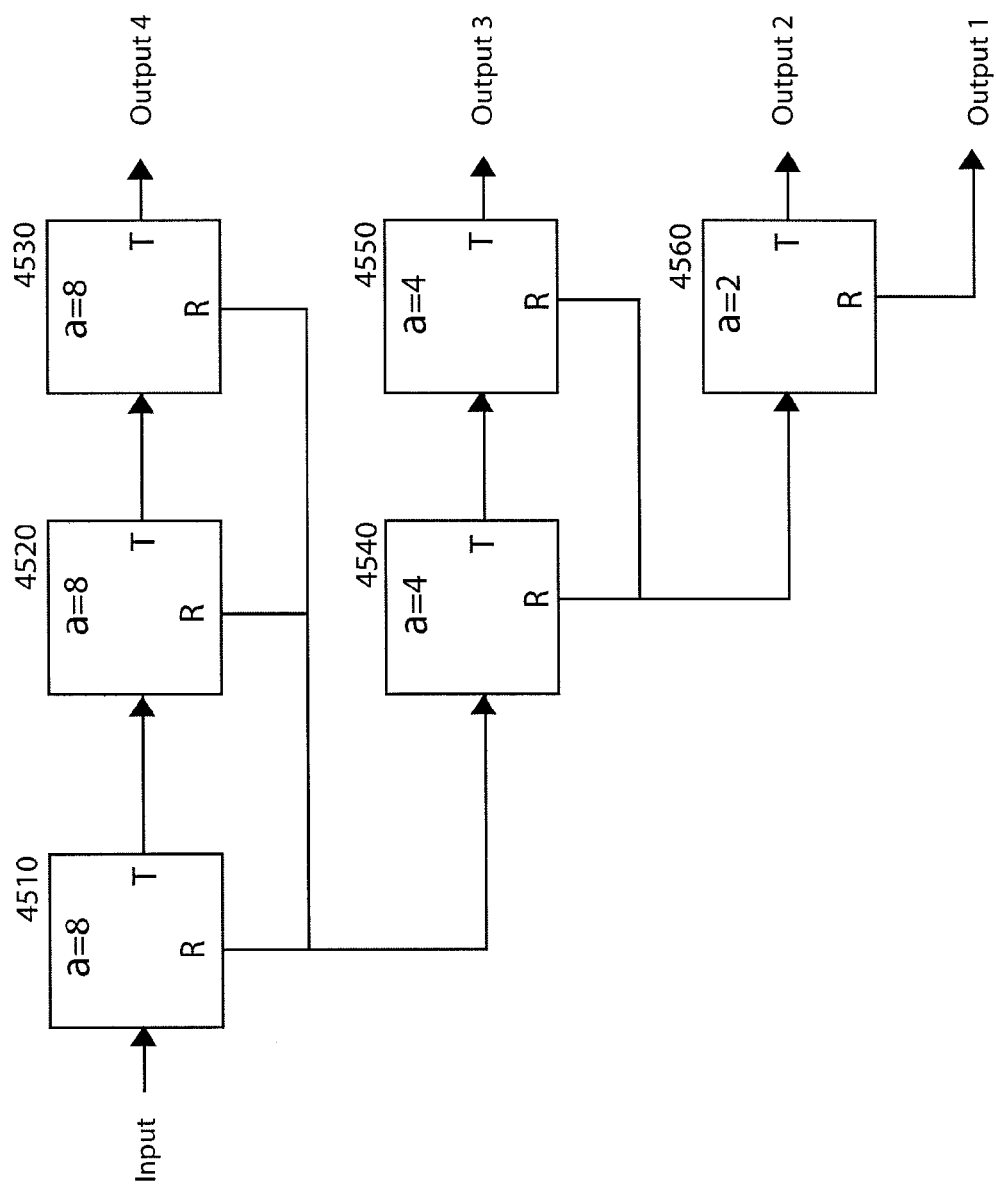
FIG. 45 shows an all-optical 4-bit analog-to-digital converter based on stable, non-absorbing optical hard limiters in accordance with an embodiment of the present invention.

FIG. 45 shows an exemplary all-optical 4-bit ADC 4500 in accordance with an embodiment of the present invention. The ADC 4500 has 4 processing levels, which, for convenience, are numbered 1 through 4. A processing level x (with x =1 to 4) includes (x−1) optical limiters. Thus, processing level 1 includes zero optical limiters, processing level 2 includes one optical limiter 4560, processing level 3 includes two optical limiters 4540 and 4550, and processing level 4 includes three optical limiters 4510,4520, and 4530.

Within a particular processing level x, each of the (x−1) optical limiters is biased such that:

$$a=I=2^{x-1}.$$

Thus, the optical limiter 4560 is biased with a=I=2, the optical limiters 4540 and 4550 are biased with a=I=4, and the optical limiters 4510, 4520, and 4530 are biased with a=I=8.

Within a particular processing level x, the (x−1) optical limiters (if there is more than one optical limiter in the processing level x) are connected in series, with the transmitted signal from one optical limiter coupled as the input to the subsequent optical limiter, and the transmitted signal of the final optical limiter in the series represents the optical output signal for the processing level x. The reflected signals from the (x−1) optical limiters (if there is at least one optical limiter in the processing level x) are coupled together as the input to the processing level (x−1).

In processing level 4, the optical input signal is fed as an input to optical limiter 4510. The transmitted signal from optical limiter 4510 is fed as an input to optical limiter 4520. The transmitted signal from optical limiter 4520 is fed as an input to optical limiter 4530. The transmitted signal from optical limiter 4530 represents the optical output signal for processing level 4. The reflected signals from optical limiters 4510, 4520, and 4530 are combined and fed as an input to processing level 3, and, more particularly, as an input to optical limiter 4540. The transmitted signal from optical limiter 4540 is fed as an input to optical limiter 4550. The transmitted signal from optical limiter 4550 represents the optical output signal for processing level 3. The reflected signals from optical limiters 4540 and 4550 are combined and fed as an input to processing level 2, and, more particularly, as an input to optical limiter 4560. The transmitted signal from optical limiter 4560 represents the optical output signal for processing level 2. The reflected signal from optical limiter 4560 represents the output signal for processing level 1.

Figure 46:
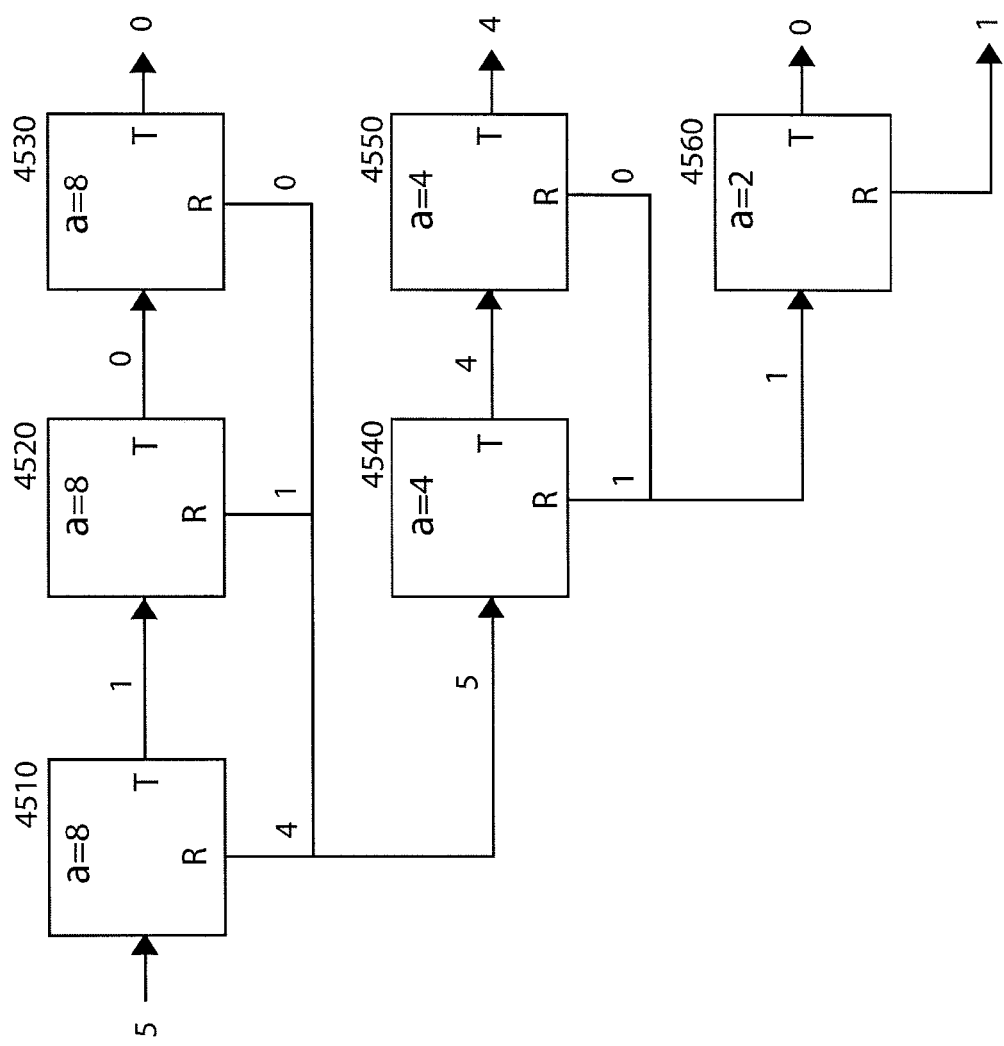
FIG. 46 demonstrates analog-to-digital conversion of an optical input signal having a relative intensity of five using an all-optical 4-bit analog-to-digital converter in accordance with an embodiment of the present invention.

Various aspects of the present invention can be demonstrated by example using the all-optical 4-bit ADC 4500. FIG. 46 demonstrates the analog-to-digital conversion of an optical input signal with a relative intensity of five using the all-optical 4-bit ADC 4500. The optical signal with intensity of five is fed as an input to optical limiter 4510. The transmitted signal from optical limiter 4510, which has an intensity of one, is fed as an input to optical limiter 4520. The transmitted signal from optical limiter 4520, which has an intensity of zero, is fed as an input to optical limiter 4530. The transmitted signal from optical limiter 4530, which has an intensity of zero, represents the optical output signal for processing level 4. The reflected signals from optical limiters 4510, 4520, 4530, which have intensities of four, one, and zero, respectively, are combined and fed as an input with an intensity of five to the optical limiter 4540. The transmitted signal from optical limiter 4540, which has an intensity of four, is fed as an input to optical limiter 4550. The transmitted signal from optical limiter 4550, which has an intensity of four, represents the optical output signal for processing level 3. The reflected signals from the optical limiters 4540 and 4550, which have intensities of one and zero, respectively, are combined and fed as an input with an intensity of one to the optical limiter 4560. The transmitted signal from optical limiter 4560, which has an intensity of zero, represents the optical output signal for processing level 2. The reflected signal from optical limiter 4560, which has an intensity of one, represents the optical output signal for processing level 1.

Thus, the ADC 4500 converts the input signal with an intensity of five into binary values zero, one, zero, one (i.e., the binary value for the number five) for processing levels four, three, two, and one, respectively.

It should be noted that delay elements of the type described above can be used at the ADC outputs to ensure that all optical output signals presented at substantially the same time.

ADDITIONAL DISCLOSURE

Some exemplary applications are also discussed in detail in Brzozowski & Sargent, which was incorporated by reference above, in Johnson, Brzozowski & Sargent, "All-Optical Time-Domain IP Router Using Optical Limiters," *LEOS* 2000, Puerto Rico, vol. 1, pp. 33-34 (2000), which is hereby incorporated by reference in its entirety, and in E. V. Johnson, "All-Optical Signal Processing and Packet Forwarding Using Nonmonotonic Intensity Transfer Characteristics," a thesis submitted in conformity with the requirements for the degree of Master of Applied Science, Graduate Department of Electrical and Computer Engineering, University of Toronto (2001), which is hereby incorporated herein by reference in its entirety.

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. An entirely passive all-optical device comprising
   a stack of a plurality of alternating layers of a first medium and a second medium, each medium characterized by a Kerr coefficient having one of a negative nonlinear coefficient and a positive nonlinear coefficient, each medium further characterized by a linear index of refraction, the Kerr coefficients of the first and second media being of opposite sign and substantially equal magnitude, the linear indices of refraction of the first and second media having substantially different magnitudes, the alternating layers arranged such that the medium having the higher linear index of refraction has the negative nonlinear coefficient and the medium having the lower linear index of refraction has the positive nonlinear coefficient.

2. An optical hard limiter comprising an entirely passive all-optical device consisting of alternating layers of materials having oppositely signed Kerr coefficients and substantially different linear indices of refraction, wherein the higher linear index material has the negative Kerr coefficient and the lower linear index material has the positive Kerr coefficient.

3. The optical hard limiter of claim 2, wherein transmitted characteristics of the optical hard limiter comprise:
   a first range bounded by input signals in the range of approximately zero to I1 in which the transmitted output signal of the stable, non-absorbing optical hard limiter is approximately zero;
   a second range bounded by input signals in the range approximately from I1 to I2 in which the transmitted output signal of the stable, non-absorbing optical hard limiter increases from zero to I2; and
   a third range bounded by input signals in the range above approximately I2 in which the transmitted output signal of the stable, non-absorbing optical hard limiter is approximately I2, where I1 is approximately half of I2.

\* \* \* \* \*